(12) United States Patent
Fujita et al.

(10) Patent No.: US 10,266,198 B2
(45) Date of Patent: Apr. 23, 2019

(54) MOTOR CONTROL DEVICE

(71) Applicant: JTEKT CORPORATION, Osaka-shi, Osaka (JP)

(72) Inventors: Yuji Fujita, Okazaki (JP); Hiroshi Kawamura, Okazaki (JP); Atsuo Sakai, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 29 days.

(21) Appl. No.: 15/668,868

(22) Filed: Aug. 4, 2017

(65) Prior Publication Data
US 2018/0043928 A1    Feb. 15, 2018

(30) Foreign Application Priority Data

Aug. 10, 2016  (JP) .................................. 2016-157635

(51) Int. Cl.
*B62D 5/04* (2006.01)
*B62D 6/10* (2006.01)
(Continued)

(52) U.S. Cl.
CPC ........... *B62D 5/0463* (2013.01); *B62D 5/046* (2013.01); *B62D 5/0481* (2013.01); *B62D 6/10* (2013.01); *H02P 25/22* (2013.01); *H02P 29/028* (2013.01)

(58) Field of Classification Search
CPC ...... B62D 5/003; B62D 5/0403; B62D 5/046; B62D 5/0463; B62D 15/0265; B62D 5/0481; B60L 11/1803
See application file for complete search history.

(56) References Cited

U.S. PATENT DOCUMENTS

2004/0040778 A1* 3/2004 Katou .................... B62D 5/003
                                                180/402
2005/0159866 A1* 7/2005 Takeuchi ............... B62D 5/003
                                                701/41
(Continued)

FOREIGN PATENT DOCUMENTS

DE          19833460 A1    1/2000
EP          1394014 A1     3/2004
(Continued)

OTHER PUBLICATIONS

Jan. 5, 2018 Search Report issued in European Patent Application No. 17185356.7.

*Primary Examiner* — Redhwan K Mawari
(74) *Attorney, Agent, or Firm* — Oliff PLC

(57) ABSTRACT

There is provided a motor control device capable of preventing occurrence of a difference in command value between control systems and reducing torque ripples and noise and vibration of a motor, unlike in a case where a motor is controlled by control systems that are independent from each other. In a motor control device, at least one of parameters for a first control system is shared by both of the systems, and a first control calculation circuit and a second control calculation circuit calculate the assist command values based on the parameter. Thus, motor drive circuits of the control systems drive motor coils based on the assist command values. Namely, when the steering torques and the vehicle speeds for the control systems are all normal, assist control circuits of the control systems calculate the assist command values based on the steering torque and the vehicle speed.

4 Claims, 19 Drawing Sheets

(51) Int. Cl.
*H02P 25/22* (2006.01)
*H02P 29/028* (2016.01)

(56) References Cited

U.S. PATENT DOCUMENTS

| | | | |
|---|---|---|---|
| 2013/0015814 A1* | 1/2013 | Kelty | B60L 3/0046 320/109 |
| 2013/0241452 A1* | 9/2013 | Suzuki | B62D 5/0403 318/400.15 |

FOREIGN PATENT DOCUMENTS

| | | | |
|---|---|---|---|
| EP | 1512609 A1 | 3/2005 | |
| JP | 2004-010024 A | 1/2004 | |
| JP | 2004-142731 A | 5/2004 | |
| WO | WO-2005047066 A1 * | 5/2005 | B60R 21/013 |

* cited by examiner

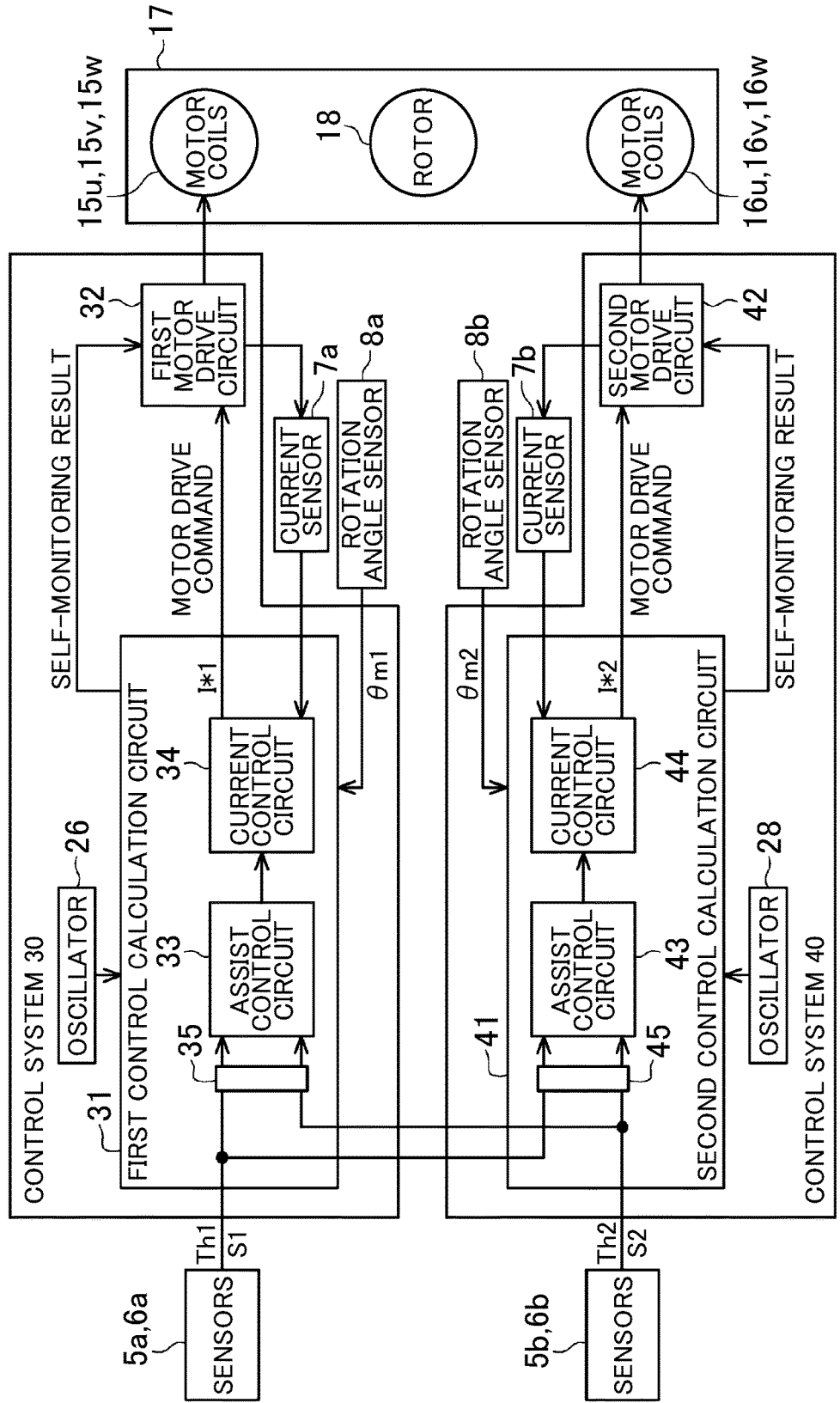

MOTOR CONTROL DEVICE

INCORPORATION BY REFERENCE

The disclosure of Japanese Patent Application No. 2016-157635 filed on Aug. 10, 2016 including the specification, drawings and abstract, is incorporated herein by reference in its entirety.

BACKGROUND OF THE INVENTION

1. Field of the Invention

The invention relates to a motor control device.

2. Description of the Related Art

As an example of a motor control device, an electric power steering system (EPS) for a vehicle is known. The electric power steering system is configured such that a torque sensor detects a steering torque applied to a steering shaft at the time of steering, and an assist control circuit calculates an assist command value, which is a control desired value for an electric motor (hereinafter, referred to as "motor"), based on the steering torque or based on the steering torque and a vehicle speed from a vehicle speed sensor.

Further, the electric power steering system is configured such that a motor control circuit calculates a motor current command value on the basis of the assist command value, and a motor driver outputs a motor current based on the motor current command value to the motor, thereby driving the motor. In recent years, some vehicles are provided with an automatic steering system that assists a driver's operation, such as an advanced driver assistance system (ADAS). In this automatic steering system, in order to improve a driver's steering feel and to perform automatic steering, a motor of an EPS is controlled on the basis of, for example, a command value based on steering performed by the driver, a command value based on an environment surrounding a host vehicle, which is measured by a measurement device, such as a camera or a radar.

In order to cope with, for example, automatic driving as described above, an electric power steering system having a redundant system configuration is proposed (see Japanese Patent Application Publication No. 2004-10024). This electric power steering system includes two systems each including sensors, an assist control circuit, a motor control circuit, a motor driver, and a motor, which are configured as described above. This redundant system configuration enables more stable motor control.

However, even when the redundant system configuration is employed, the following unfavorable situation may occur. That is, if the steering torques, or the vehicle speeds detected by the sensors for the respective systems are different from each other, different motor current command values are output to the motors of the respective systems based on command values, such as assist current command values, which are calculated in the respective systems. It is not preferable that there is a difference in command value between the two systems.

SUMMARY OF THE INVENTION

One object of the invention is to provide a motor control device capable of preventing occurrence of a difference in command value between control systems and improving the performance of reducing torque ripples and noise and vibration (NV) of a motor when a parameter output circuit configured to output a parameter required to control the motor is malfunctioning, unlike in a case where a motor is controlled by control systems that are independent from each other.

An aspect of the invention relates to a motor control device configured to drive a motor having winding wires of two systems. The motor control device includes two control systems each configured to control driving of the winding wires of a corresponding one of the two systems. Each of the two control systems includes: a motor drive circuit configured to drive motor coils of a corresponding one of the two systems; a parameter output circuit configured to output parameters required to control the motor drive circuit; and a control calculation circuit configured to calculate a command value based on the parameters. The control calculation circuit is configured to calculate the command value based on at least one of the parameters for a first control system that is shared by the two control systems, or is configured to calculate the command value based on a value obtained by averaging at least one kind of parameters, out of the parameters, for the two control systems, or the command value calculated by the control calculation circuit of the first control system is shared by the two control systems. The motor drive circuit of each of the control systems is configured to drive the motor coils based on the command value.

With the above-described configuration, it is possible to prevent occurrence of a difference in command value between the two control systems. It is therefore possible to improve the performance of reducing torque ripples and noise and vibration (NV) of the motor, unlike in a case where a redundant system includes control systems that are completely independent from each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a block diagram of a motor control device according to a first embodiment;

DETAILED DESCRIPTION OF EMBODIMENTS

Hereinafter, a motor control device according to a first embodiment will be described with reference to FIG. 1 to FIG. 4. First, an electric power steering system, to which the motor control device according to the present embodiment is applied, will be schematically described.

Figure 1:
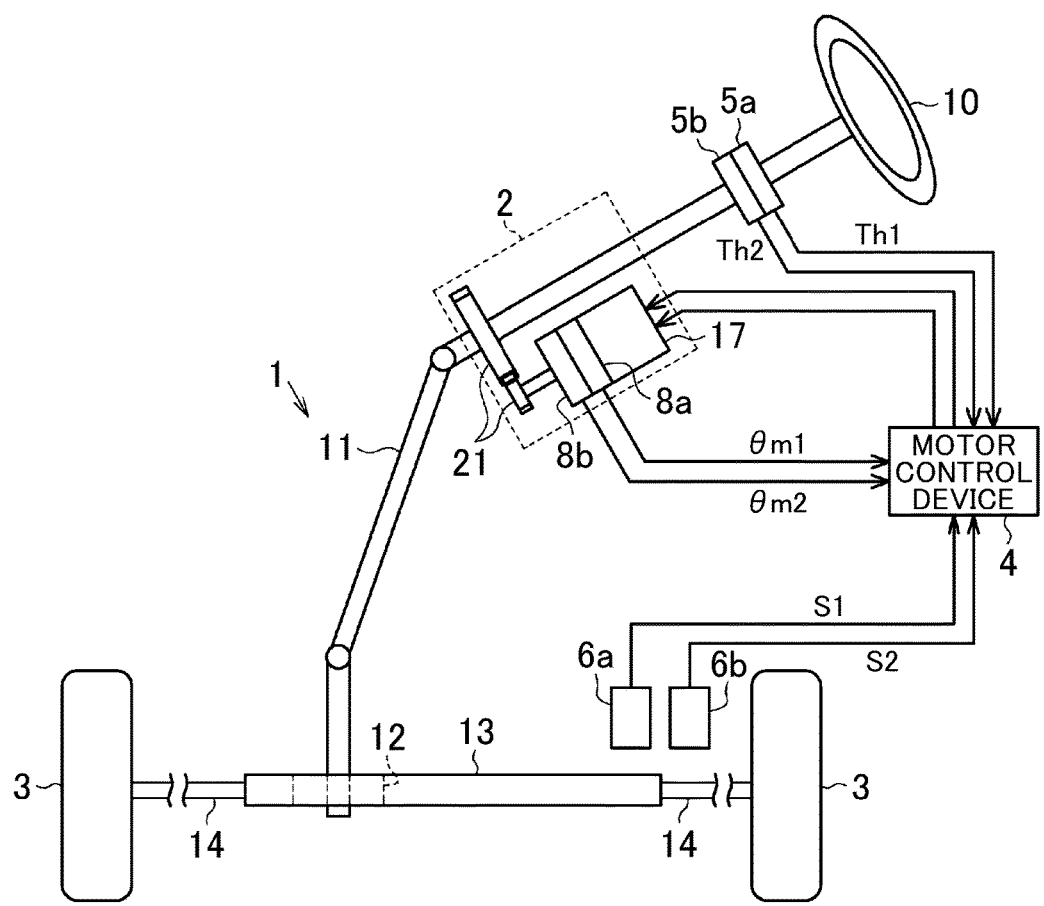
FIG. 1 is a block diagram illustrating the schematic configuration of an electric power steering system.

As illustrated in FIG. 1, the electric power steering system includes a steering mechanism 1 and an assist mechanism 2. The steering mechanism 1 serves as a steering system that steers steered wheels 3 in response to a driver's operation of a steering wheel 10. The assist mechanism 2 assists the driver's steering operation.

The steering mechanism 1 includes a steering shaft 11 that serves as a rotary shaft of the steering wheel 10, and a rack shaft 13 coupled to a lower end portion of the steering shaft 11 via a rack-and-pinion mechanism 12. As the steering shaft 11 rotates in response to a driver's operation of the steering wheel 10, the rotary motion is converted into a reciprocating linear motion of the rack shaft 13 in its axial direction via the rack-and-pinion mechanism 12, in the steering mechanism 1. The reciprocating linear motion of the rack shaft 13 is transmitted to the steered wheels 3 via tie rods 14 coupled to respective ends of the rack shaft 13, whereby the steered angle of the steered wheels 3 changes and thus the traveling direction of a vehicle changes.

The assist mechanism 2 includes a motor 17 that applies assist torque to the steering shaft 11. As the rotation of the motor 17 is transmitted to the steering shaft 11 via a speed-reducer 21, the assist torque is applied to the steering shaft 11 and thus the steering operation is assisted.

The motor 17 is a so-called surface permanent magnet motor (SPM motor). Note that, the motor 17 is not limited to a SPM motor, and may be an interior permanent magnet motor (IPM motor). The motor 17 is a brushless three-phase motor having winding wires of two systems. The motor 17 includes a stator (not illustrated) and a rotor 18 (see FIG. 2). The motor 17 is an example of a motor having winding wires of two systems. The rotor 18 is provided with a plurality of permanent magnets (not illustrated). The permanent magnets are arranged in the circumferential direction of the rotor 18 so as to be exposed on a surface of the rotor 18. The permanent magnets are magnetized along a radial direction of the rotor 18. The permanent magnets are provided such that the directions of magnetization of two permanent magnets adjacent to each other in the circumferential direction of the rotor 18 are opposite to each other.

The stator is provided with a plurality of motor coils 15u, 15v, 15w, 16u, 16v, 16w wound around a stator core (not illustrated). The motor coils 15u, 15v, 15w, 16u, 16v, 16w are classified into two motor coil groups. One of the motor coil groups includes the U-phase motor coil 15u, the V-phase motor coil 15v, and the W-phase motor coil 15w that are delta-connected to each other. The other one of the motor coil groups includes the U-phase motor coil 16u, the V-phase motor coil 16v, and the W-phase motor coil 16w that are delta-connected to each other. When both the motor coil groups are driven, the rotor 18 shared by the two motor coil groups is rotated. When only one of the motor coil groups (for example, the motor coils 15u, 15v, 15w or the motor coils 16u, 16v, 16w) is driven, the output from the motor 17 is half of the output from the motor 17 when both the motor coil groups are driven. The motor coils of each of the motor coil groups may be star-connected to each other, instead of being delta-connected to each other.

The electric power steering system includes various sensors that detect an operation amount of the steering wheel 10 and state quantities of the vehicle. The various sensors will be described later. Next, a motor control device 4 that controls the motor 17 will be described.

As illustrated in FIG. 2, the motor control device 4 constitutes a redundant system including two control systems that are control systems 30, 40 having the same configuration, that is, having the same standards and the same specifications.

The control system 30 includes a first control calculation circuit 31 and a first motor drive circuit 32 including inverter circuits of three phases (U-phase, V-phase, and W-phase). The first control calculation circuit 31 is a micro processing unit (MPU), and performs the functions of an assist control circuit 33, a current control circuit 34, and an abnormality detection circuit 35 when control programs are executed.

The assist control circuit 33 receives various parameters (a steering torque and a vehicle speed) described later, and calculates an assist command value (assist current command value), which is a command value, based on the parameters and with the use of, for example, an assist map. Details of the operation of the assist control circuit 33 will be described later.

The current control circuit 34 receives the assist command value (assist current command value), a rotation angle $\theta m1$, and motor currents of respective phases. The current control circuit 34 converts the motor currents of respective phases into a d-axis current value and a q-axis current value of a dq coordinate system with the use of the rotation angle $\theta m1$. The current control circuit 34 then executes current feedback control for causing the d-axis current value and the q-axis current value to follow a d-axis current command value and a q-axis current command value, thereby calculating a d-axis voltage command value and a q-axis voltage command value, respectively. Then, the current control circuit 34 converts the d-axis voltage command value and the q-axis voltage command value into phase voltage command values of respective phases with the use of the rotation angle $\theta m1$.

The current control circuit 34 obtains a duty ratio of each phase based on the phase voltage command value of each phase and outputs a control signal I*1 of each phase to the first motor drive circuit 32 based on the duty ratio of each phase, thereby driving the first motor drive circuit 32 in a pulse-width modulation (PWM) manner. The control signal I*1 corresponds to a motor drive command.

Thus, driving electric power corresponding to the control signal I*1 is supplied from the first motor drive circuit 32 to the motor coils 15u, 15v, 15w. The first control calculation circuit 31 has a self-monitoring function of monitoring the state of the first control calculation circuit 31. When a self-monitoring result indicates that the first control calculation circuit 31 is not functioning normally, power supply to the first motor drive circuit 32 is shut off.

The abnormality detection circuit 35 executes abnormality detection on steering torques Th1, Th2 received from torque sensors 5a, 5b (described later) and abnormality detection on vehicle speeds S1, S2 received from vehicle speed sensors 6a, 6b (described later). In this specification, the state where a parameter is abnormal means that an abnormality has occurred in a parameter output circuit (i.e., a sensor), whereas the state where a parameter is normal means that the parameter output circuit is functioning normally.

The abnormality detection circuit 35 inputs, into the assist control circuit 33, only the steering torque that is determined not to be abnormal (that is, determined to be normal) as a result of the abnormality detection on the steering torque. The abnormality detection circuit 35 inputs, into the assist control circuit 33, only the vehicle speed that is determined not to be abnormal (that is, determined to be normal) as a result of the abnormality detection on the vehicle speed.

An abnormality detection method for the abnormality detection circuit 35 may be any known method. For example, whether a value (a steering torque or a vehicle speed) input into the abnormality detection circuit 35 is abnormal may be determined by comparing the value with a threshold set in advance. Alternatively, whether each steering torque is normal may be determined as follows. A difference between an immediately preceding value and a present value of each steering torque is obtained. When the difference is equal to or smaller than a determination threshold, it is determined that the steering torque is normal. On the other hand, when the difference exceeds the determination threshold, it is determined that the steering torque is abnormal. Also, whether each vehicle speed is normal may be determined as follows. A difference between an immediately preceding value and a present value of each vehicle speed is obtained. When the difference is equal to or smaller than a determination threshold, it is determined that the vehicle speed is normal. On the other hand, when the difference exceeds the determination threshold, it is determined that the vehicle speed is abnormal.

The control system 40 includes a second control calculation circuit 41 and a second motor drive circuit 42 including inverter circuits of three phases (U-phase, V-phase, and W-phase). The second control calculation circuit 41 is a micro processing unit (MPU), and includes an assist control circuit 43, a current control circuit 44, and an abnormality detection circuit 45.

The assist control circuit 43 receives various parameters (a steering torque and a vehicle speed) described later, and calculates an assist command value (assist current command value) based on the parameters and with the use of, for example, an assist map. The assist map employed in the assist control circuit 43 is the same as the assist map employed in the assist control circuit 33. Details of the operation of the assist control circuit 43 will be described later.

The current control circuit 44 receives the assist command value (assist current command value) output from the assist control circuit 43, a rotation angle θm2, and motor currents of respective phases. The current control circuit 44 converts the motor currents of respective phases into a d-axis current value and a q-axis current value of a dq coordinate system with the use of the rotation angle θm2. The current control circuit 44 then executes current feedback control for causing the d-axis current value and the q-axis current value to follow a d-axis current command value and a q-axis current command value, thereby calculating a d-axis voltage command value and a q-axis voltage command value, respectively.

Then, the current control circuit 44 converts the d-axis voltage command value and the q-axis voltage command value into phase voltage command values of respective phases with the use of the rotation angle θm2. The current control circuit 44 obtains a duty ratio of each phase based on the phase voltage command value of each phase and outputs a control signal I*2 to the second motor drive circuit 42 based on the duty ratio of each phase, thereby driving the second motor drive circuit 42 in a pulse-width modulation (PWM) manner. The control signal I*2 corresponds to a motor drive command.

Thus, driving electric power corresponding to the control signal I*2 is supplied from the second motor drive circuit 42 to the motor coils 16u, 16v, 16w. The control systems 30, 40 respectively include oscillators 26, 28 that generate a clock having a fundamental frequency. The first control calculation circuit 31 of the control system 30 and the second control calculation circuit 41 of the control system 40 calculate, for example, the assist command values and output the calculation results in synchronization based on the clock having the fundamental frequency and generated by the oscillators 26, 28.

The second control calculation circuit 41 has a self-monitoring function of monitoring the state of the second control calculation circuit 41. When a self-monitoring result indicates that the second control calculation circuit 41 is not functioning normally, power supply to the second motor drive circuit 42 is shut off.

The abnormality detection circuit 45, as well as the abnormality detection circuit 35, executes abnormality detection on the steering torques Th1, Th2 received from the torque sensors 5a, 5b (described later) and abnormality detection on the vehicle speeds S1, S2 received from the vehicle speed sensors 6a, 6b (described later).

The abnormality detection circuit 45, as well as the abnormality detection circuit 35, inputs, into the assist control circuit 43, only the steering torque that is determined not to be abnormal (that is, determined to be normal) as a result of the abnormality detection on the steering torque. The abnormality detection circuit 45, as well as the abnormality detection circuit 35, inputs, into the assist control circuit 43, only the vehicle speed that is determined not to be abnormal (that is, determined to be normal) as a result of the abnormality detection on the vehicle speed.

In the present embodiment, the control systems 30, 40 are each provided with various sensors. The configurations of the sensors for the control system 30 are the same as the configurations of the sensors for the control system 40. As illustrated in FIG. 1, specifically, the steering shaft 11 is provided with the torque sensors 5a, 5b that respectively detect the steering torques Th1, Th2 applied to the steering shaft 11 in response to a driver's steering operation. The steering torque Th1 detected by the torque sensor 5a is input into the abnormality detection circuit 35 of the first control calculation circuit 31, and the steering torque Th2 detected by the torque sensor 5b is input into the abnormality detection circuit 45 of the second control calculation circuit 41.

The vehicle is provided with the vehicle speed sensors 6a, 6b that detect the vehicle speed. The vehicle speed S1 detected by the vehicle speed sensor 6a is input into the abnormality detection circuit 35 of the first control calculation circuit 31, and the vehicle speed S2 detected by the vehicle speed sensor 6b is input into the abnormality detection circuit 45 of the second control calculation circuit 41.

In the present embodiment, the steering torque Th1 and the vehicle speed S1 input into the first control calculation circuit 31 are also input into the abnormality detection circuit 45 of the second control calculation circuit 41 through inter-microcomputer communication, such as SPI or LIN. The steering torque Th2 and the vehicle speed S2 input into the second control calculation circuit 41 are also input into the abnormality detection circuit 35 of the first control calculation circuit 31 through inter-microcomputer communication.

As illustrated in FIG. 1 and FIG. 2, the motor 17 is provided with rotation angle sensors 8a, 8b that respectively detect the rotation angles (electric angles) $\theta m1$, $\theta m2$ of the motor 17. The rotation angle $\theta m1$ detected by the rotation angle sensor 8a is input into the current control circuit 34 of the control system 30, and the rotation angle $\theta m2$ detected by the rotation angle sensor 8b is input into the current control circuit 44 of the control system 40.

As illustrated in FIG. 2, the first motor drive circuit 32 of the control system 30 is provided with a current sensor 7a that detects the motor currents of the respective phases flowing through power feed paths extending from the first motor drive circuit 32 to the U-phase motor coil 15u, the V-phase motor coil 15v, and the W-phase motor coil 15w.

As illustrated in FIG. 2, the second motor drive circuit 42 of the control system 40 is provided with a current sensor 7b that detects the motor currents of the respective phases flowing through power feed paths extending from the second motor drive circuit 42 to the U-phase motor coil 16u, the V-phase motor coil 16v, and the W-phase motor coil 16w.

In the present embodiment, the torque sensors 5a, 5b, the vehicle speed sensors 6a, 6b, and the current sensors 7a, 7b may each function as a parameter output circuit, and each of detection signals output from the sensors corresponds to a parameter.

The operation of the motor control device 4 having the foregoing configuration will be described below. For the sake of convenience, the following description will be provided on the assumption that the first control calculation circuit 31 and the second control calculation circuit 41 are functioning normally according to the results obtained by the self-monitoring functions of the first control calculation circuit 31 and the second control calculation circuit 41.

Figure 3A:
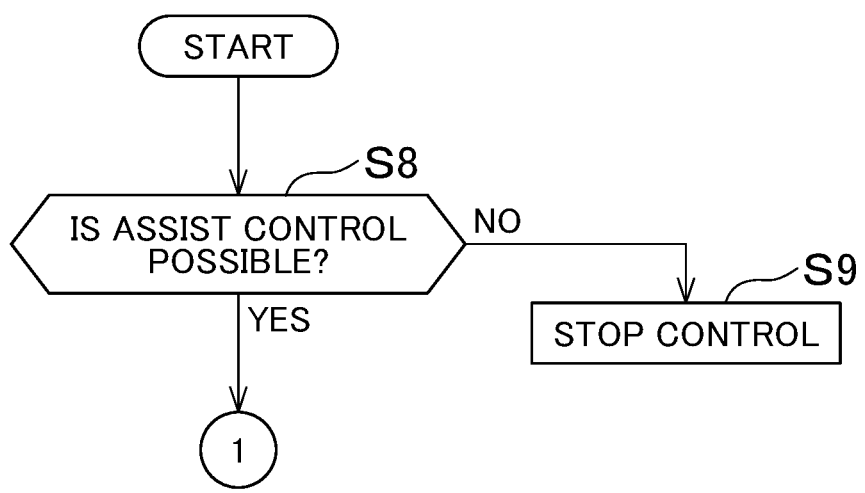
FIG. 3A is a flowchart executed by an assist control circuit 33 of a control system 30.
Figure 3B:
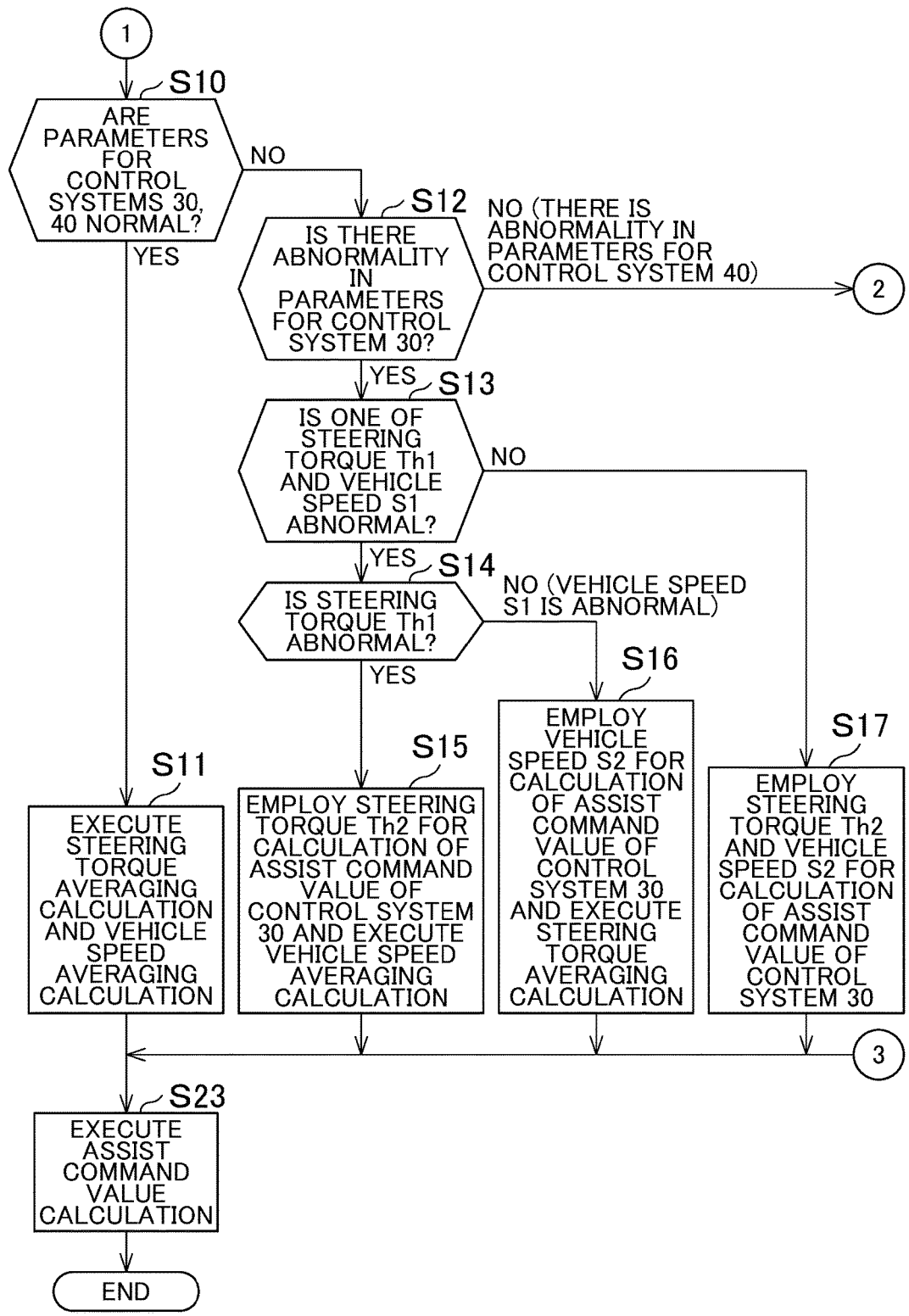
FIG. 3B is a flowchart executed by the assist control circuit 33 of the control system 30.
Figure 3C:
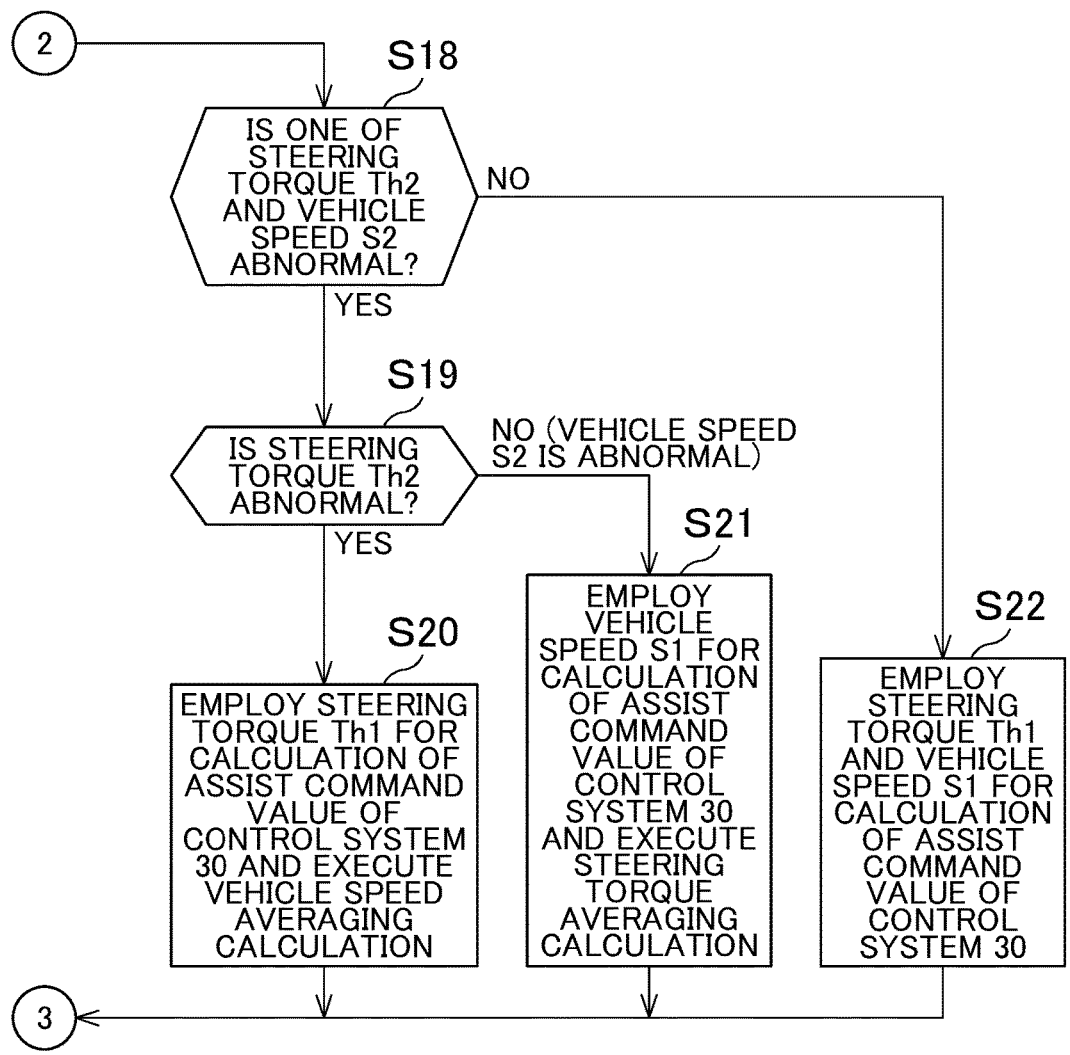
FIG. 3C is a flowchart executed by the assist control circuit 33 of the control system 30.

FIG. 3A and FIG. 3B are flowcharts that are executed by the assist control circuit 33 of the control system 30 according to a program for calculating an assist command value.

In S8, the assist control circuit 33 determines whether it is possible to execute assist control. The cases where it is not possible to execute the assist control include the following cases (1) to (3):

(1) a case where none of the parameters (i.e., the steering torques and the vehicle speeds) for the control systems 30, 40 have been input into the control systems 30, 40;

(2) a case where neither of the steering torques for the control systems 30, 40 have been input into the control systems 30, 40; and (3) a case where neither of the vehicle speeds for the control systems 30, 40 have been input into the control systems 30, 40.

In any one of the cases (1) to (3), the assist control circuit 33 makes a negative determination (NO), and proceeds to S9 to stop the assist control, thereby stopping the motor 17.

When the assist control circuit 33 determines that the present state is other than the cases (1) to (3), the assist control circuit 33 proceeds to S10. In S10, the assist control circuit 33 determines whether all of the parameters for the control systems 30, 40 are normal. Specifically, when all of the steering torques Th1, Th2 and the vehicle speeds S1, S2 have been input into the control systems 30, 40, the assist control circuit 33 determines that all of the parameters for the control systems 30, 40 are normal, and proceeds to S11.

When all of the parameters (the steering torques Th1, Th2 and the vehicle speeds S1, S2) for the control systems 30, 40 are not normal (i.e., when at least one of the parameters for the control systems 30, 40 is abnormal), the assist control circuit 33 proceeds to S12. In S11, the assist control circuit 33 executes averaging calculation by taking an arithmetical average of the steering torques Th1, Th2, and sets the calculation result as a steering torque Th. The assist control circuit 33 executes averaging calculation by taking an arithmetical average of the vehicle speeds S1, S2, and sets the calculation result as a vehicle speed S. Then, the assist control circuit 33 proceeds to S23.

In S12, the assist control circuit 33 determines whether there is an abnormality in the parameters (the steering torque Th1 and the vehicle speed S1) for the control system 30. When there is an abnormality in the parameters (the steering torque Th1 and the vehicle speed S1) for the control system 30, that is, when at least one of the parameters (the steering torque and the vehicle speed) for the control system 30 is not input into the control system 30, the assist control circuit 33 makes an affirmative determination (YES) and proceeds to S13.

When there is an abnormality in the parameters (the steering torque Th2 and the vehicle speed S2) for the control system 40, the assist control circuit 33 proceeds to S18. In S13, the assist control circuit 33 determines whether one of the steering torque Th1 and the vehicle speed S1 is abnormal or both of the steering torque Th1 and the vehicle speed S1 are abnormal. When one of the steering torque Th1 and the vehicle speed S1 is abnormal, the assist control circuit 33 proceeds to S14. When both of the steering torque Th1 and the vehicle speed S1 are abnormal, the assist control circuit 33 proceeds to S17.

In S14, the assist control circuit 33 determines whether the steering torque Th1 is abnormal. When the steering torque Th1 is abnormal, the assist control circuit 33 proceeds to S15. When the steering torque Th1 is normal and the vehicle speed S1 is abnormal, the assist control circuit 33 proceeds to S16.

In S15, the assist control circuit 33 sets the steering torque Th2 as the steering torque Th to be used in the calculation of the assist command value (assist current command value) of the control system 30, which is executed in S23 described later. The assist control circuit 33 executes averaging calculation by taking an arithmetical average of the vehicle speeds S1, S2, and sets the calculation result as the vehicle speed S. Then, the assist control circuit 33 proceeds to S23.

In S16, the assist control circuit 33 sets the vehicle speed S2 as the vehicle speed S to be used in the calculation of the assist command value (assist current command value) of the control system 30, which is executed in S23 described later. The assist control circuit 33 executes averaging calculation by taking an arithmetical average of the steering torques Th1, Th2, and sets the calculation result as the steering torque Th. Then, the assist control circuit 33 proceeds to S23.

In S17, the assist control circuit 33 sets the steering torque Th2 and the vehicle speed S2 as the steering torque Th and the vehicle speed S to be used in the calculation of the assist command value (assist current command value) of the control system 30, which is executed in S23 described later. Then, the assist control circuit 33 proceeds to S23.

In S18, the assist control circuit 33 determines whether one of the steering torque Th2 and the vehicle speed S2 is abnormal or both of the steering torque Th2 and the vehicle speed S2 are abnormal. When one of the steering torque Th2 and the vehicle speed S2 is abnormal, the assist control circuit 33 proceeds to S19. When both of the steering torque Th2 and the vehicle speed S2 are abnormal, the assist control circuit 33 proceeds to S22.

In S19, the assist control circuit 33 determines whether the steering torque Th2 is abnormal. When the steering torque Th2 is abnormal, the assist control circuit 33 proceeds to S20. When the steering torque Th2 is normal and the vehicle speed S2 is abnormal, the assist control circuit 33 proceeds to S21.

In S20, the assist control circuit 33 sets the steering torque Th1 as the steering torque Th to be used in the calculation of the assist command value (assist current command value) of the control system 30, which is executed in S23 described later. The assist control circuit 33 executes averaging calculation by taking an arithmetical average of the vehicle speeds S1, S2, and sets the calculation result as the vehicle speed S. Then, the assist control circuit 33 proceeds to S23.

In S21, the assist control circuit 33 sets the vehicle speed S1 as the vehicle speed S to be used in the calculation of the assist command value (assist current command value) of the control system 30, which is executed in S23 described later. The assist control circuit 33 executes averaging calculation by taking an arithmetical average of the steering torques Th1, Th2, and sets the calculation result as the steering torque Th. Then, the assist control circuit 33 proceeds to S23.

In S22, the assist control circuit 33 sets the steering torque Th1 and the vehicle speed S1 as the steering torque Th and the vehicle speed S to be used in the calculation of the assist command value (assist current command value) of the control system 30, which is executed in S23 described later.

In S23, calculation of the assist command value (assist current command value) is executed based on the steering torque Th and the vehicle speed S set in S11, S15, S16, S17, S20, S21, or S22 and with the use of, for example, the assist map.

The current control circuit 34 illustrated in FIG. 2 outputs the control signal I*1, which is a result of calculation executed according to the foregoing operation based on the assist command value, to the first motor drive circuit 32, thereby driving the first motor drive circuit 32 in a PWM manner. Thus, driving electric power corresponding to the control signal I*1 is supplied from the first motor drive circuit 32 to the motor coils 15u, 15v, 15w.

Figure 4A:
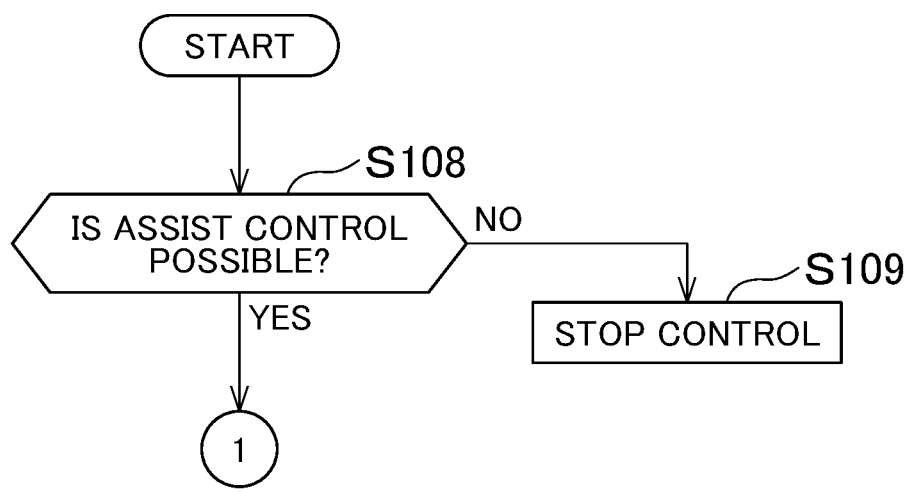
FIG. 4A is a flowchart executed by an assist control circuit 43 of a control system 40.
Figure 4B:
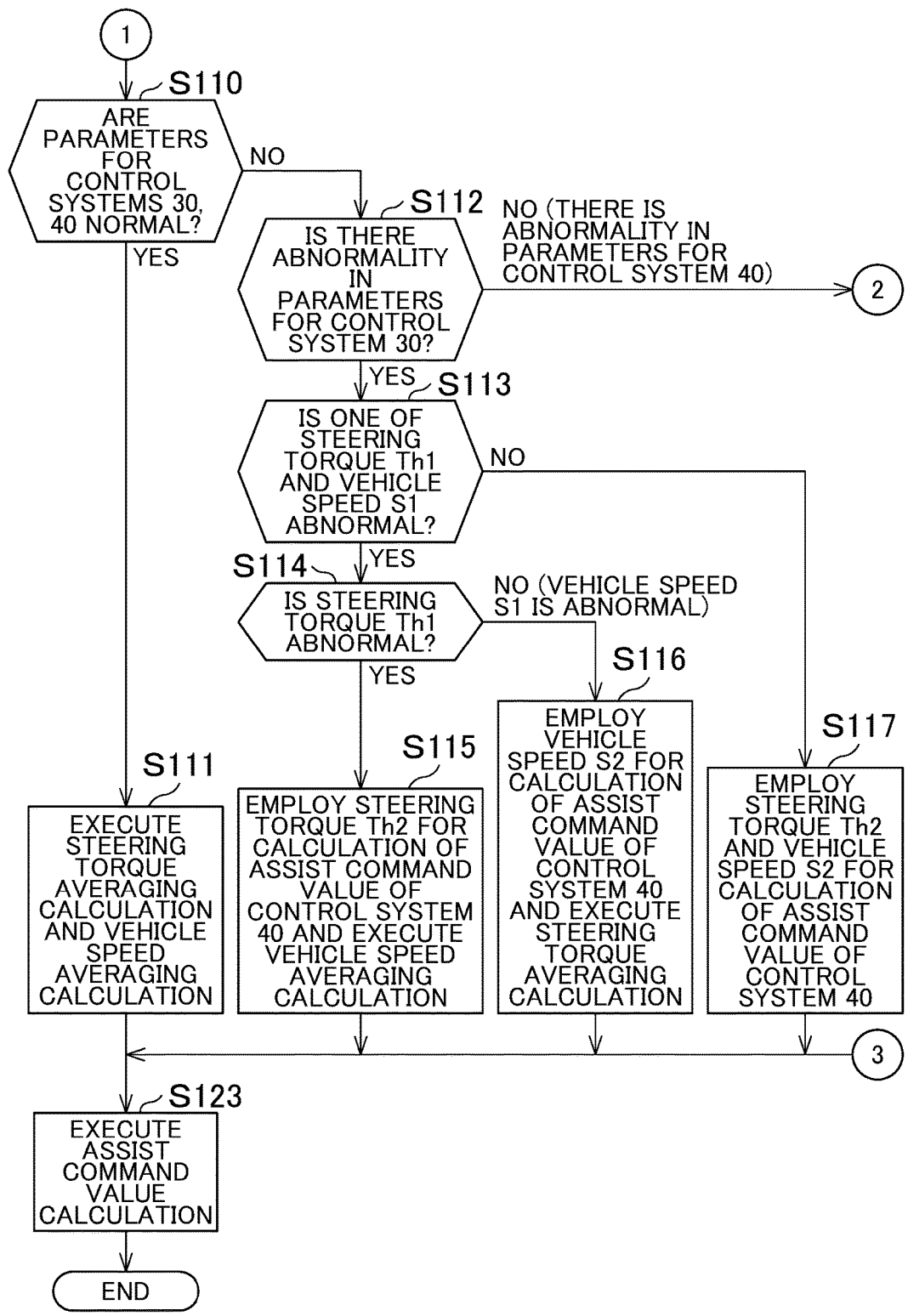
FIG. 4B is a flowchart executed by the assist control circuit 43 of the control system 40.
Figure 4C:
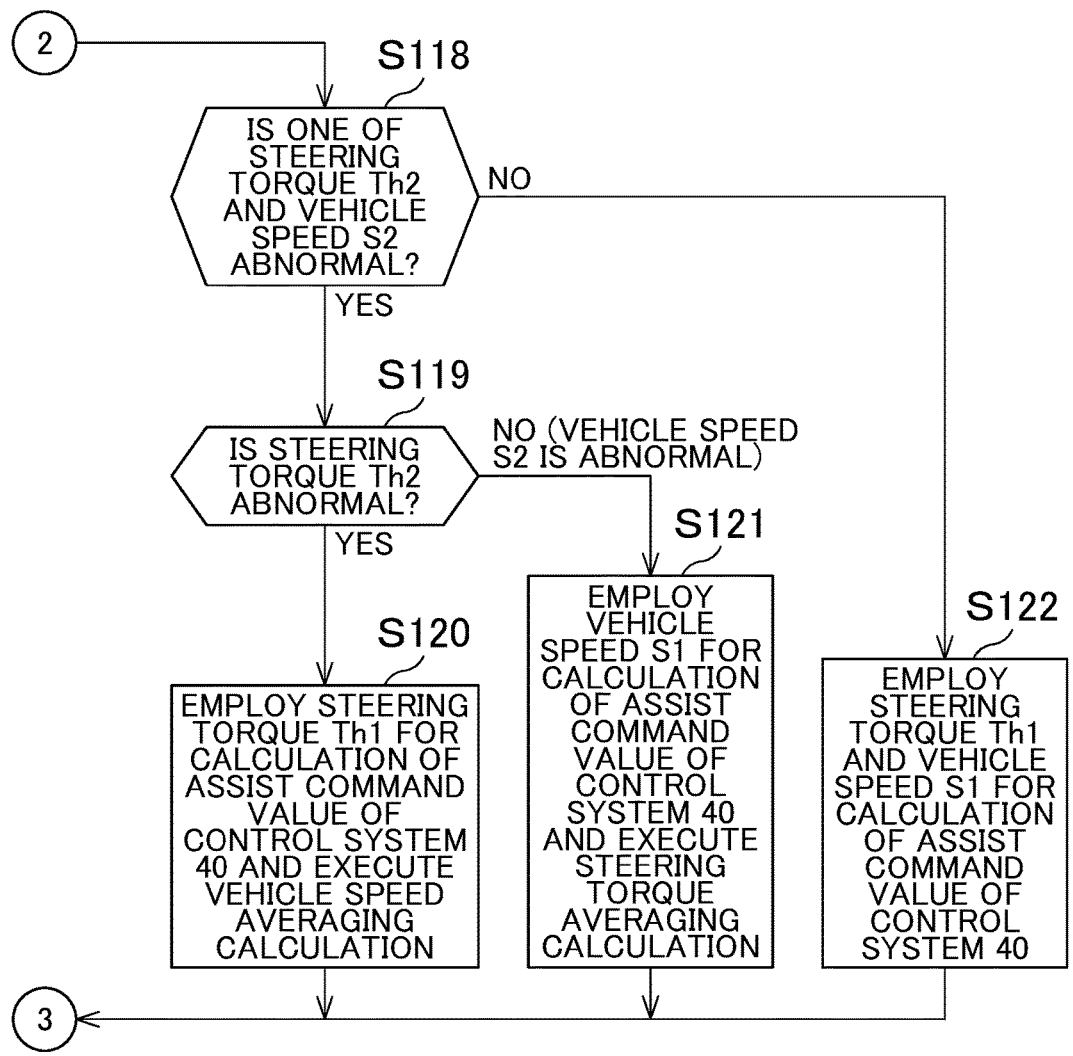
FIG. 4C is a flowchart executed by the assist control circuit 43 of the control system 40.

FIG. 4A and FIG. 4B are flowcharts that are executed by the assist control circuit 43 of the control system 40 according to a program for calculating an assist command value. S108 to S114, S118, and S119 are the same as the processes executed by the assist control circuit 33 in S8 to S14, S18, and S19 in the flowcharts in FIG. 3A and FIG. 3B. The description of S108 to S114, S118, and S119 can be provided by substituting the assist control circuit 43 for the assist control circuit 33 in the description of S8 to S14, S18, and S19. Therefore, detailed description of S108 to S114, S118, and S119 will be omitted. Description of S115 to S117 and S120 to S122 executed by the assist control circuit 43 of the control system 40 can be provided by respectively substituting the assist control circuit 43 and the control system 40 for the assist control circuit 33 and the control system 30 in the description of S15 to S17 and S20 to S22. Therefore, detailed description of S115 to S117 and S120 to S122 will be omitted.

In S123, calculation of the assist command value (assist current command value) is executed based on the steering torque and the vehicle speed calculated or set in S111, S115, S116, S117, S120, S121, or S122 and with the use of, for example, the assist map.

The current control circuit 44 illustrated in FIG. 2 outputs the control signal I*2, which is a result of calculation executed according to the foregoing operation based on the assist command value, to the second motor drive circuit 42, thereby driving the second motor drive circuit 42 in a PWM manner. Thus, driving electric power corresponding to the control signal I*2 is supplied from the second motor drive circuit 42 to the motor coils 16u, 16v, 16w.

The present embodiment has the following characteristic.

(1) In the motor control device 4 according to the present embodiment, the control systems 30, 40 respectively include the first motor drive circuit 32 and the second motor drive circuit 42 that drive the motor coils 15u, 15v, 15w, 16u, 16v, 16w. The motor control device 4 are provided with the vehicle speed sensors 6a, 6b and the current sensors 7a, 7b (parameter output circuits) that output the steering torques and the vehicle speeds (parameters) required to control the first motor drive circuit 32 and the second motor drive circuit 42. The motor control device 4 includes the first control calculation circuit 31 and the second control calculation circuit 41 that calculate the assist command values (command values) based on the parameters.

When the parameter output circuits are functioning normally, the first control calculation circuit 31 and the second control calculation circuit 41 of the motor control device 4 calculate the assist command values based on values obtained by averaging the parameters for the control systems 30, 40. Based on the assist command values obtained through the calculation, the first motor drive circuit 32 and the second motor drive circuit 42 of the control systems 30, 40 drive the motor coils 15u, 15v, 15w, 16u, 16v, 16w.

When the torque sensors and the vehicle speed sensors for the control systems 30, 40 are all functioning normally, the assist command values are calculated based on the average value of the steering torques Th1, Th2 and the average value of the vehicle speeds S1, S2. Therefore, it is possible to prevent occurrence of a difference in assist command value for the assist control between the control systems 30, 40 due to variations of the input values from the torque sensors and variations of the input values from the vehicle speed sensors. For this reason, with the redundant system according to the present embodiment, it is possible to improve the performance of reducing torque ripples and noise and vibration (NV) of the motor 17, as compared with a redundant system including control systems that are completely independent from each other.

(2) In the motor control device 4 according to the present embodiment, when the parameter for a first control system, out of the control systems 30, 40, is abnormal, the first control calculation circuit 31 and the second control calculation circuit 41 of the control systems 30, 40 share the parameter from the parameter output circuit for a remaining second control system to calculate the assist command values (command values). Then, the first motor drive circuit 32 and the second motor drive circuit 42 of the control systems 30, 40 drive the motor coils 15u, 15v, 15w, 16u, 16v, 16w based on the assist command values.

In related art, when a malfunction has occurred in a torque sensor (parameter output circuit) or a vehicle speed sensor (parameter output circuit) for a first control system, driving of the motor coils to be controlled by the first control system is stopped. Thus, the assist torque applied to a steering system that assists a driver's steering operation is reduced by half.

In contrast to this, in the motor control device 4 according to the present embodiment, when the sensor that detects the steering torque or the vehicle speed (parameter) for the first control system is malfunctioning, the assist command value (command value) calculated by the second control system with the normally-functioning sensor is shared by the first and second control systems. Thus, driving of the motor coils to be controlled by the first control system with the malfunctioning sensor is not stopped. As a result, according to the present embodiment, even when the sensor that detects the steering torque or the vehicle speed (parameter) for the first control system is malfunctioning, the assist torque similar to that at normal times can be applied to the steering system.

Next, a first modified example of the first embodiment will be described with reference to FIG. 5A and FIG. 5B. The hardware configuration of the motor control device 4 according to the present modified example is the same as that in the first embodiment, and therefore description thereof will be omitted, and processes that are executed by the assist control circuits 33, 43 and that are different from those in the first embodiment will be described. In the following modified examples including the present modified example, the same configurations as those in the first embodiment will be represented by the same reference symbols as those in the first embodiment, and description thereof will be omitted.

Figure 5A:
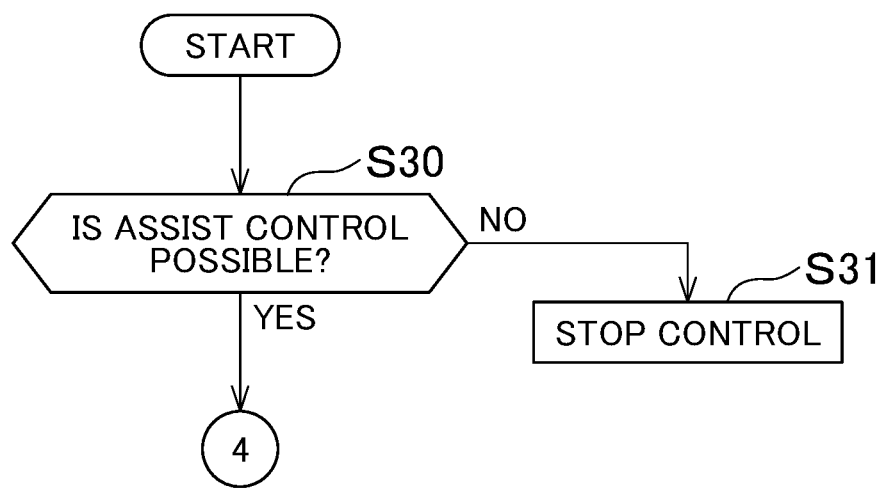
FIG. 5A is a flowchart executed by each of assist control circuits 33, 43 of control systems 30, 40 in a first modified example of the first embodiment.
Figure 5B:
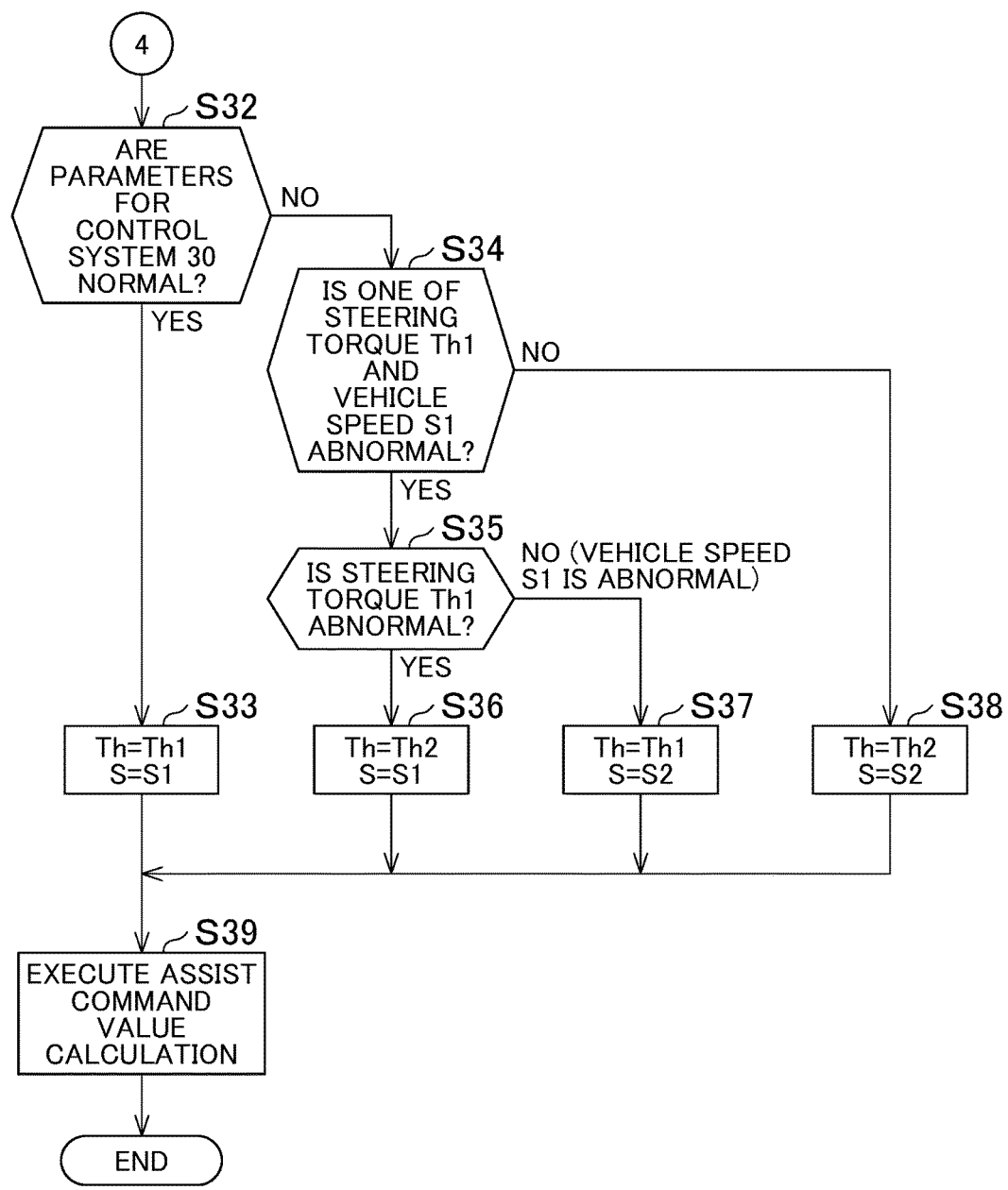
FIG. 5B is a flowchart executed by each of the assist control circuits 33, 43 of the control systems 30, 40 in the first modified example of the first embodiment.

FIG. 5A and FIG. 5B are flowcharts that are executed by the assist control circuits 33, 43 in synchronization according to the program for calculating the assist command value. For the sake of convenience, the following description will be provided on the assumption that the flowcharts are executed by the assist control circuit 33.

S30 and S31 are the same processes as those in S8 and S9 in the first embodiment, respectively. In S32, the assist control circuit 33 determines whether all of the parameters for the control system 30 are normal. Specifically, when both of the steering torque Th1 and the vehicle speed S1 have been input into the control system 30, the assist control circuit 33 determines that all of the parameters for the control system 30 are normal, that is, the parameter output circuits are functioning normally. Then, the assist control circuit 33 proceeds to S33.

When all of the parameters (the steering torque Th1 and the vehicle speed S1) for the control system 30 are not normal (i.e., when at least one of the parameters is abnormal), that is, when all of the parameter output circuits are not functioning normally (i.e., when at least one of the parameter output circuits is malfunctioning), the assist control circuit 33 proceeds to S34.

In S33, the assist control circuit 33 sets the steering torque Th1 as the steering torque Th to be used in the calculation of the assist command value, and sets the vehicle speed S1 as the vehicle speed S to be used in the calculation of the assist command value. Then, the assist control circuit 33 proceeds to S39.

In S34, the assist control circuit 33 determines whether one of the steering torque Th1 and the vehicle speed S1 is abnormal or both of the steering torque Th1 and the vehicle speed S1 are abnormal. When one of the steering torque Th1 and the vehicle speed S1 is abnormal, the assist control circuit 33 proceeds to S35. When both of the steering torque Th1 and the vehicle speed S1 are abnormal, the assist control circuit 33 proceeds to S38.

In S35, the assist control circuit 33 determines whether the steering torque Th1 is abnormal. When the steering torque Th1 is abnormal, the assist control circuit 33 proceeds to S36. When the steering torque Th1 is normal and the vehicle speed S1 is abnormal, the assist control circuit 33 proceeds to S37.

In S36, the assist control circuit 33 sets the steering torque Th2 as the steering torque Th to be used in the calculation of the assist command value (assist current command value) of the control system 30, which is executed in S39. The assist control circuit 33 sets vehicle speed S1 as the vehicle speed S to be used in the calculation of the assist command value (assist current command value). Then, the assist control circuit 33 proceeds to S39.

In S37, the assist control circuit 33 sets the steering torque Th1 as the steering torque Th to be used in the calculation of the assist command value (assist current command value) of the control system 30, which is executed in S39. The assist control circuit 33 sets the vehicle speed S2 as the vehicle speed S to be used in the calculation of the assist command value (assist current command value). Then, the assist control circuit 33 proceeds to S39.

In S38, the assist control circuit 33 sets the steering torque Th2 and the vehicle speed S2 as the steering torque Th and the vehicle speed S to be used in the calculation of the assist command value (assist current command value) of the control system 30, which is executed in S39. Then, the assist control circuit 33 proceeds to S39.

In S39, calculation of the assist command value (assist current command value) is executed based on the steering torque Th and the vehicle speed S set in S33, S36, S37, or S38 and with the use of, for example, the assist map.

The first modified example has the following characteristic.

(1) In the motor control device 4 according to the present modified example, at least one of the parameters for a first control system is shared by both of the systems, and the first control calculation circuit 31 and the second control calculation circuit 41 (control calculation circuits) calculate the assist command values (command value) based on the parameter. Thus, the motor drive circuits (the first motor drive circuit 32 and the second motor drive circuit 42) of the control systems 30, 40 drive the motor coils 15u, 15v, 15w, 16u, 16v, 16w based on the assist command values.

Specifically, in the present modified example, when the torque sensors and the vehicle speed sensors for the control systems 30, 40 are all functioning normally, the assist control circuits 33, 43 of the control systems 30, 40 calculate the assist command values based on the steering torque Th1 and the vehicle speed S1. Therefore, it is possible to prevent occurrence of a difference in assist command value for the assist control between the control systems 30, 40 due to variations of the input values from the torque sensors and variations of the input values from the vehicle speed sensors. For this reason, with the redundant system according to the present modified example, it is possible to improve the performance of reducing torque ripples and noise and vibration (NV) of the motor 17, as compared with a redundant system including control systems that are completely independent from each other.

Even when the parameter output circuit (the torque sensor or the vehicle speed sensor) for the first control system is malfunctioning, the parameter for the second control system is shared by the first and second control systems. Therefore, the foregoing advantageous effects can be easily achieved.

Next, a second modified example of the first embodiment will be described with reference to FIG. 6A and FIG. 6B. The hardware configuration of the motor control device 4 according to the present modified example is the same as that in the first modified example, and therefore description thereof will be omitted, and processes that are executed by the assist control circuits 33, 43 and that are different from those in the first modified example will be described.

Figure 6A:
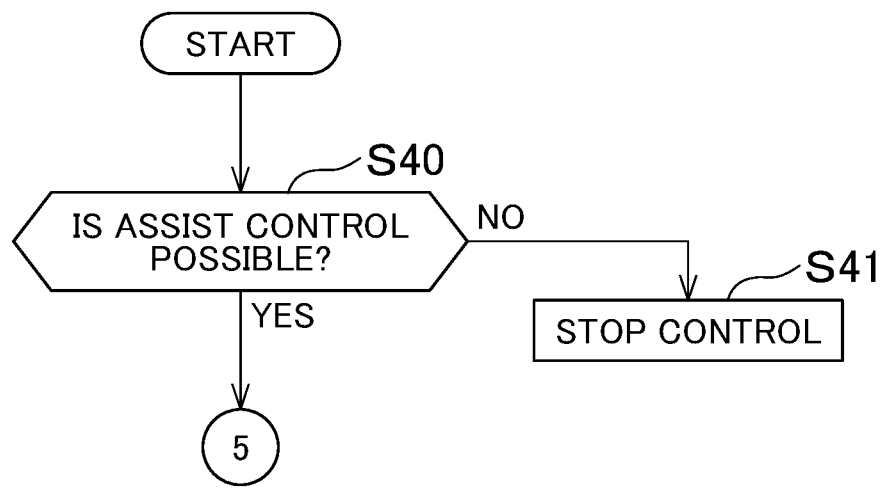
FIG. 6A is a flowchart executed by each of assist control circuits 33, 43 of control systems 30, 40 in a second modified example of the first embodiment.
Figure 6B:
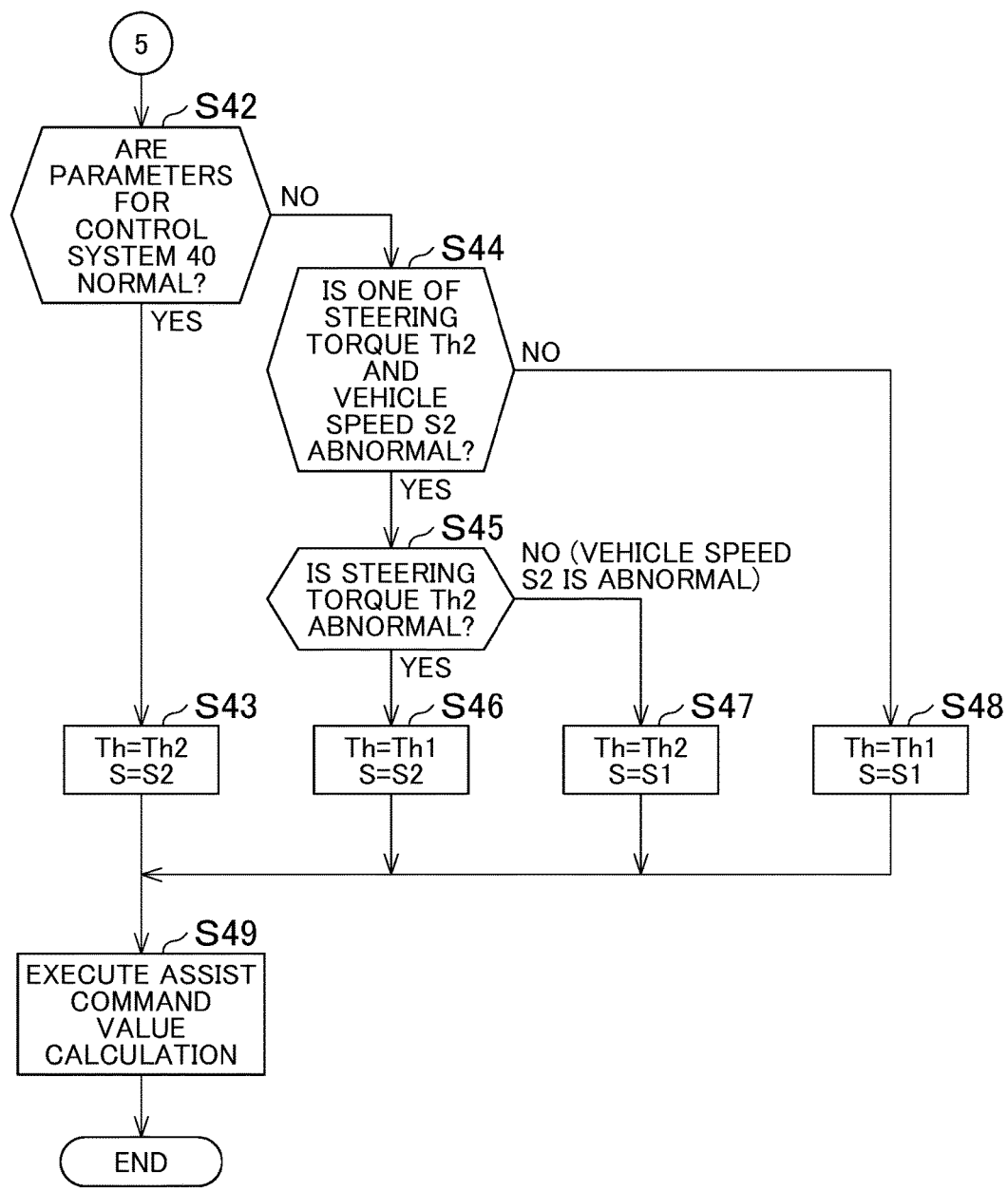
FIG. 6B is a flowchart executed by each of the assist control circuits 33, 43 of the control systems 30, 40 in the second modified example of the first embodiment.

FIG. 6A and FIG. 6B are flowcharts that are executed by the assist control circuits 33, 43 in synchronization according to the program for calculating the assist command value. For the sake of convenience, the following description will be provided on the assumption that the flowcharts are executed by the assist control circuit 33.

S40 and S41 are the same processes as those in S8 and S9 in the first embodiment, respectively. In S42, the assist control circuit 33 determines whether all of the parameters for the control system 40 are normal. Specifically, when both of the steering torque Th2 and the vehicle speed S2 have been input into the control system 30, the assist control circuit 33 determines that the parameter output circuits for the control system 40 are all functioning normally. Then, the assist control circuit 33 proceeds to S43.

When all of the parameters (the steering torque Th2 and the vehicle speed S2) for the control system 40 are not normal (i.e., when at least one of the parameters is abnormal), that is, when all of the parameter output circuits are not functioning normally (i.e., when at least one of the parameter output circuits is malfunctioning), the assist control circuit 33 proceeds to S44.

In S43, the assist control circuit 33 sets the steering torque Th2 as the steering torque Th to be used in the calculation of the assist command value, and sets the vehicle speed S2 as the vehicle speed S to be used in the calculation of the assist command value. Then, the assist control circuit 33 proceeds to S49.

In S44, the assist control circuit 33 determines whether one of the steering torque Th2 and the vehicle speed S2 is abnormal or both of the steering torque Th2 and the vehicle speed S2 are abnormal. When one of the steering torque Th2 and the vehicle speed S2 is abnormal, the assist control circuit 33 proceeds to S45. When both of the steering torque Th2 and the vehicle speed S2 are abnormal, the assist control circuit 33 proceeds to S48.

In S45, the assist control circuit 33 determines whether the steering torque Th2 is abnormal. When the steering torque Th2 is abnormal, the assist control circuit 33 proceeds to S46. When the steering torque Th2 is normal and the vehicle speed S2 is abnormal, the assist control circuit 33 proceeds to S47.

In S46, the assist control circuit 33 sets the steering torque Th1 as the steering torque Th to be used in the calculation of the assist command value (assist current command value) of the control system 30, which is executed in S49. The assist control circuit 33 sets vehicle speed S2 as the vehicle speed S to be used in the calculation of the assist command value (assist current command value). Then, the assist control circuit 33 proceeds to S49.

In S47, the assist control circuit 33 sets the steering torque Th2 as the steering torque Th to be used in the calculation of the assist command value (assist current command value) of the control system 30, which is executed in S49. The assist control circuit 33 sets the vehicle speed S1 as the vehicle speed S to be used in the calculation of the assist command value (assist current command value). Then, the assist control circuit 33 proceeds to S49.

In S48, the assist control circuit 33 sets the steering torque Th1 and the vehicle speed S1 as the steering torque Th and the vehicle speed S to be used in the calculation of the assist command value (assist current command value) of the control system 30, which is executed in S49. Then, the assist control circuit 33 proceeds to S49.

In S49, calculation of the assist command value (assist current command value) is executed based on the steering torque Th and the vehicle speed S set in S43, S46, S47, or S48 and with the use of, for example, the assist map. As a result, according to the second modified example, the same advantageous effects as those in the first modified example can be achieved.

Figure 7:
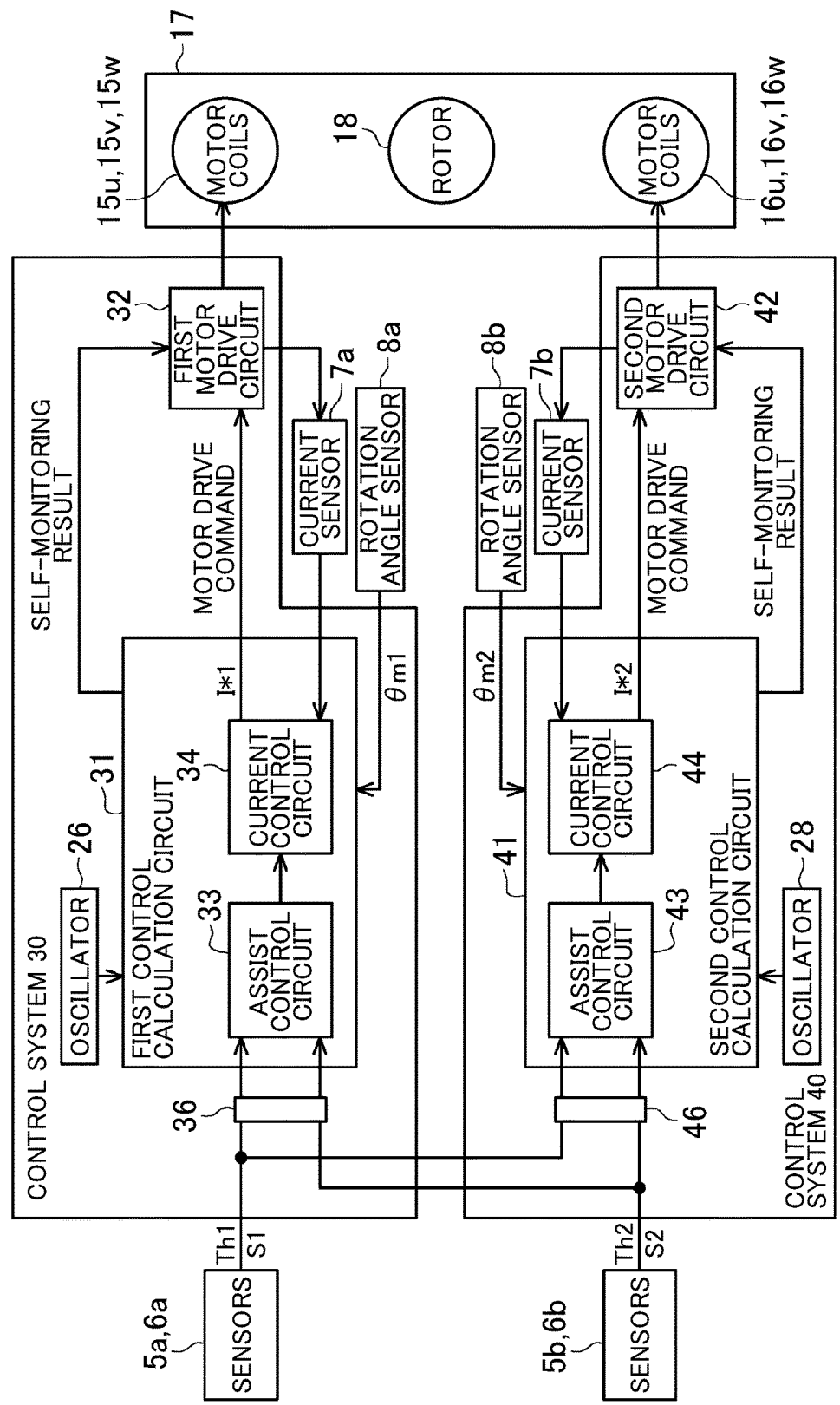
FIG. 7 is a block diagram of a motor control device according to a second embodiment.

Next, a motor control device 4 according to a second embodiment will be described with reference to FIG. 7. The present embodiment is different from the first embodiment only in the hardware configuration described below, and other configurations of the present embodiment are the same as those in the first embodiment. Therefore, the configurations that are different from those in the first embodiment will be described below.

The present embodiment differs from the first embodiment as follows. In the first embodiment, the abnormality detection circuits 35, 45 function when the control program is executed by the MPU. However, in the present embodiment, abnormality detection circuits 36, 46 having hardware configuration are provided.

Specifically, the abnormality detection circuit 36 receives detection signals (the steering torques Th1, Th2 and the vehicle speeds S1, S2) from the sensors (the torque sensor 5a and the vehicle speed sensor 6a, and the torque sensor 5b and the vehicle speed sensor 6b), detects the presence or absence of an abnormality in the detection signals, and inputs only the normal detection signals into the assist control circuit 33 of the first control calculation circuit 31.

The abnormality detection circuit 46 receives the detection signals (the steering torques Th1, Th2 and the vehicle speeds S1, S2) from the sensors (the torque sensor 5a and the vehicle speed sensor 6a, and the torque sensor 5b and the vehicle speed sensor 6b), detects the presence or absence of an abnormality in the detection signals, and inputs only the normal detection signals into the assist control circuit 43 of the second control calculation circuit 41.

The assist control circuit 33 of the first control calculation circuit 31 and the assist control circuit 43 of the second control calculation circuit 41 in the present embodiment respectively execute the flowcharts in FIGS. 3A, 3B, and the flowcharts in FIGS. 4A, 4B.

For this reason, in the present embodiment, the same effects as those in the first embodiment can be achieved. In a first modified example of the present embodiment as well as in the first modified example of the first embodiment, the assist control circuit 33 of the first control calculation circuit 31 and the assist control circuit 43 of the second control calculation circuit 41 may execute the flowcharts in FIG. 5A and FIG. 5B.

In a second modified example of the present embodiment as well as in the second modified example of the first embodiment, the assist control circuit 33 of the first control calculation circuit 31 and the assist control circuit 43 of the second control calculation circuit 41 may execute the flowcharts in FIG. 6A and FIG. 6B.

A motor control device 4 according to a third embodiment will be described with reference to FIG. 8. The present embodiment differs from the first embodiment as follows.

The abnormality detection circuits 35, 45 in the configuration of the first embodiment are omitted in the present embodiment. In the present embodiment, the steering torque Th1 detected by the torque sensor 5a and the vehicle speed S1 detected by the vehicle speed sensor 6a are input into the assist control circuit 33, and the steering torque Th2 detected by the torque sensor 5b and the vehicle speed S2 detected by the vehicle speed sensor 6b are input into the assist control circuit 43.

The assist command value calculated by the assist control circuit 33 of the control system 30 is input into switching circuits 37, 47 provided respectively in the first control calculation circuit 31 of the control system 30 and the second control calculation circuit 41 of the control system 40. The switching circuits 37, 47 are configured to function according to the control programs executed by the micro processing units respectively constituting the first control calculation circuit 31 and the second control calculation circuit 41.

The assist command value calculated by the assist control circuit 43 of the control system 40 is input into the switching circuits 37, 47. The assist command value calculated by the assist control circuit 33 is input into the switching circuit 47 through inter-microcomputer communication, and the assist command value calculated by the assist control circuit 43 is input into the switching circuit 37 through inter-microcomputer communication.

The switching circuit 37 outputs the assist command value calculated by one of the assist control circuit 33 and the assist control circuit 43 to the current control circuit 34. The switching circuit 47 outputs the assist command value calculated by one of the assist control circuit 33 and the assist control circuit 43 to the current control circuit 44.

Figure 8:
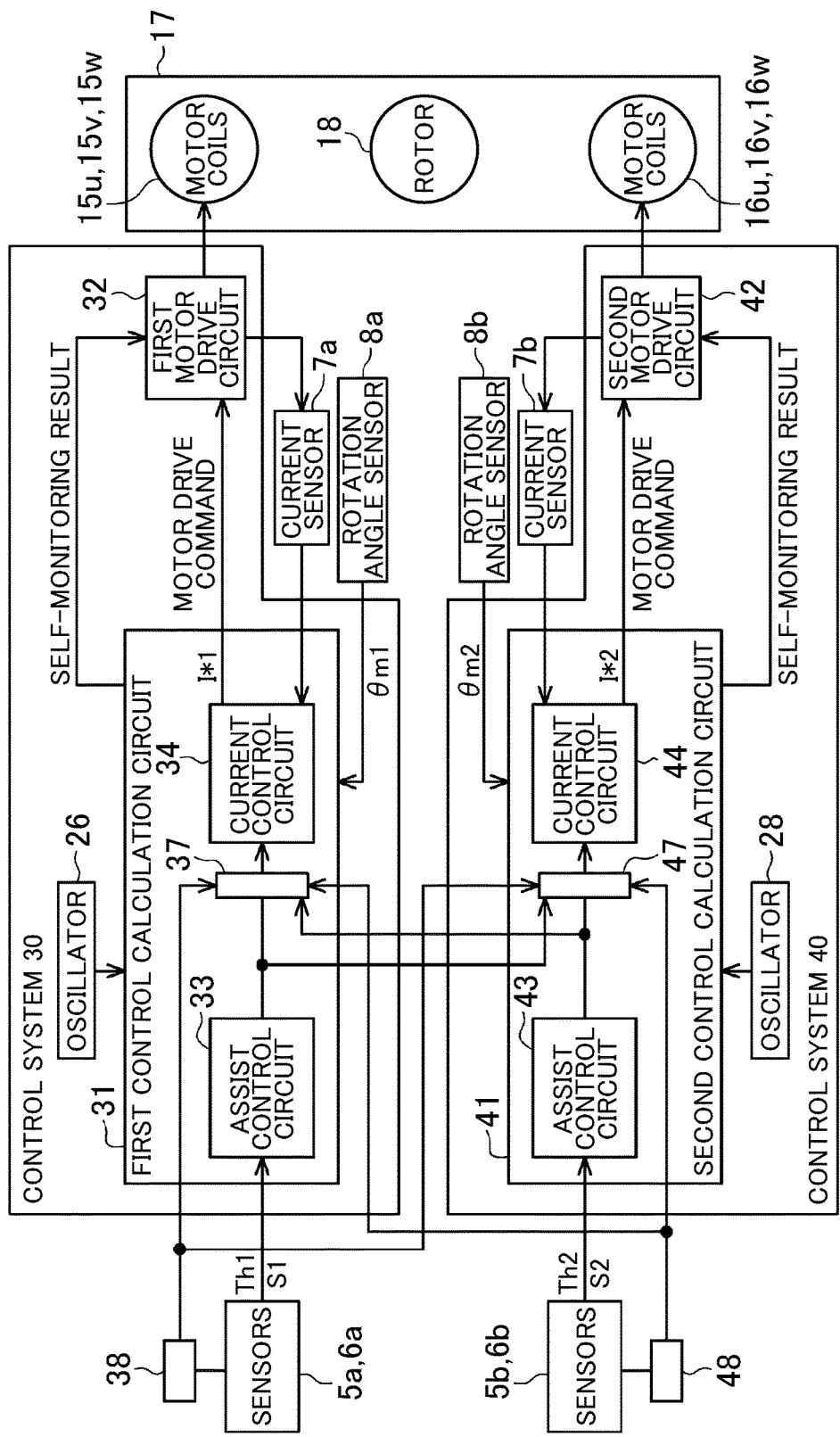
FIG. 8 is a block diagram of a motor control device according to a third embodiment.

As illustrated in FIG. 8, in the present embodiment, there are provided a sensor malfunction determination circuit 38 that determines whether a malfunction has occurred in each of the torque sensor 5a and the vehicle speed sensor 6a, a sensor malfunction determination circuit 48 that determines whether a malfunction has occurred in each of the torque sensor 5b and the vehicle speed sensor 6b. The determination results obtained by the sensor malfunction determination circuits 38, 48 are input into the switching circuits 37, 47, respectively.

The operation of the present embodiment will be described with reference to flowcharts in FIG. 9 and FIG. 10. The following description will be provided on the assumption that the assist control circuits 33, 43 of the control systems 30, 40 calculate the assist command values based on the detection signals from the sensors (the torque sensor 5a and the vehicle speed sensor 6a, and the torque sensor 5b and the vehicle speed sensor 6b).

Figure 9:
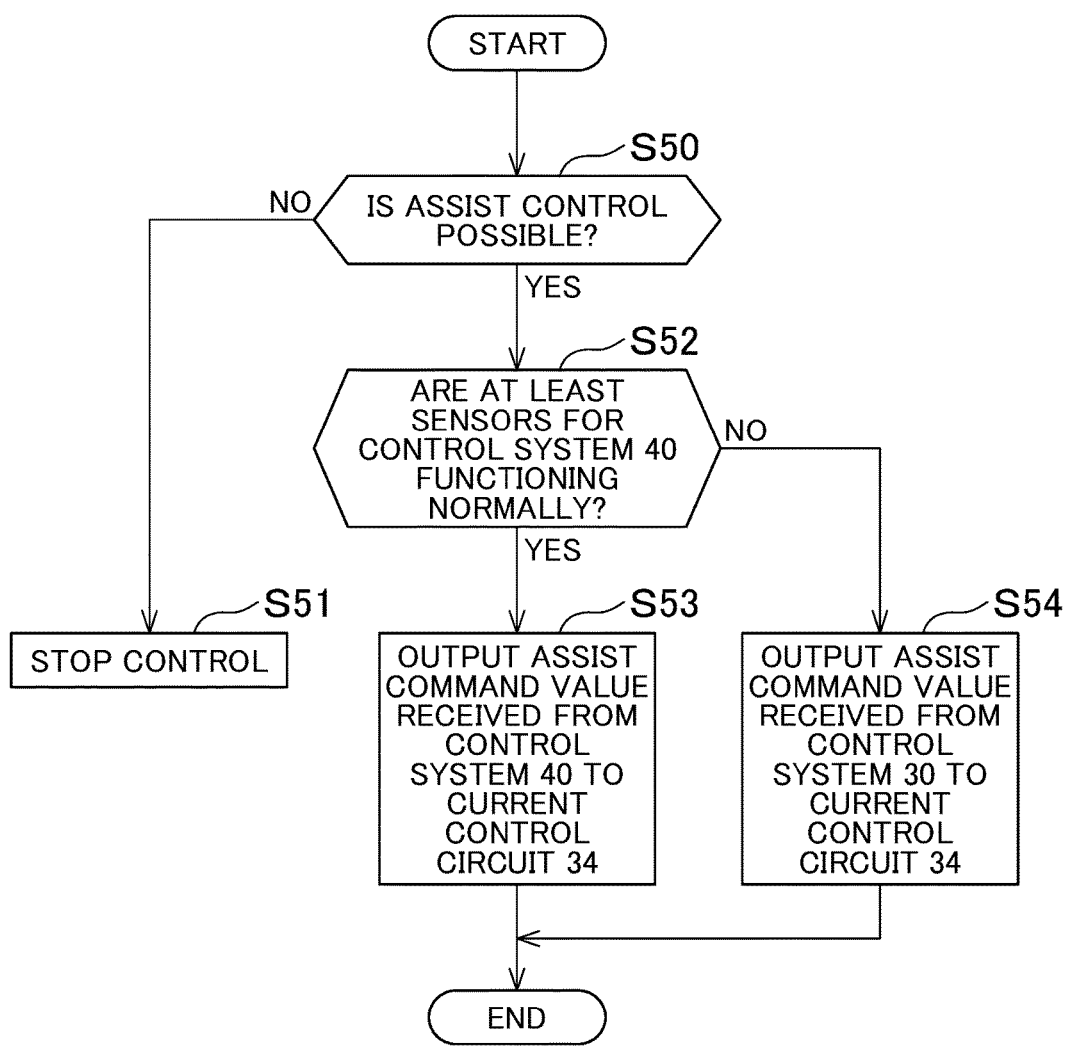
FIG. 9 is a flowchart executed by a switching circuit 37.
Figure 10:
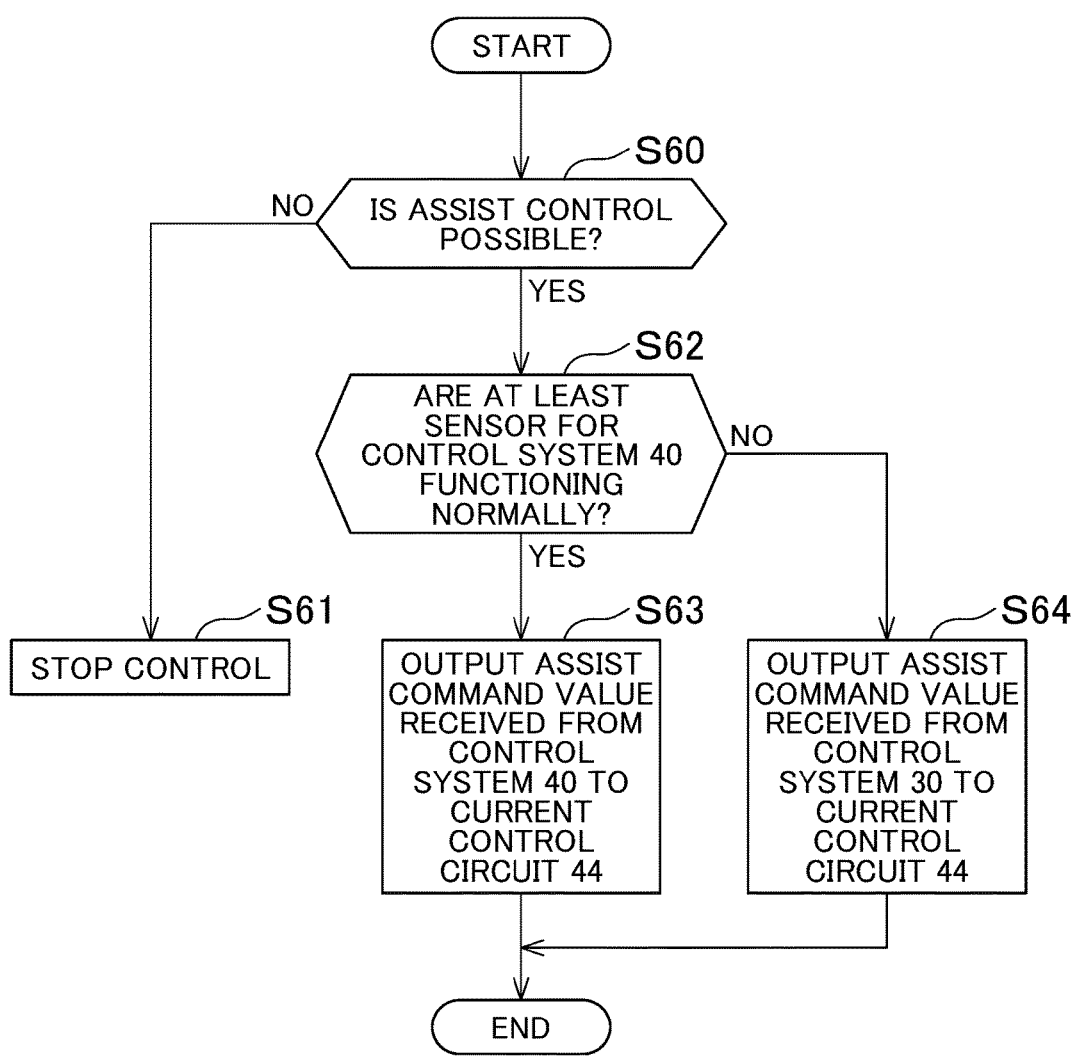
FIG. 10 is a flowchart executed by a switching circuit 47.

FIG. 9 is a flowchart that is executed by the switching circuit 37 of the control system 30 according to a switching program. In S50, the switching circuit 37 determines whether it is possible to execute assist control, based on the determination results obtained by the sensor malfunction determination circuits 38, 48.

The cases where it is not possible to execute the assist control include the following cases (1) to (3):

(1) a case where the determination results that all of the torque sensor 5a, the vehicle speed sensor 6a, the torque sensor 5b, and the vehicle speed sensor 6b are malfunctioning have been input into the control systems 30, 40 from the sensor malfunction determination circuits 38, 48;

(2) a case where the determination results that both of the torque sensors 5a, 5b are malfunctioning have been input into the control systems 30, 40 from the sensor malfunction determination circuits 38, 48; and (3) a case where the determination results that both of the vehicle speed sensors 6a, 6b are malfunctioning have been input into the control systems 30, 40 from the sensor malfunction determination circuits 38, 48.

This is because, in any one of the cases (1) to (3), the assist control circuits 33, 43 of the control systems 30, 40 cannot calculate appropriate assist command values, and it is therefore not possible to execute the assist control.

In any one of the cases (1) to (3), the switching circuit 37 makes a negative determination, and proceeds to S51. When the switching circuit 37 proceeds to S51, the first control calculation circuit 31 stops the assist control, thereby stopping driving of the motor coils 15u, 15v, 15w.

When the switching circuit 37 determines that the present state is other than the cases (1) to (3), the switching circuit 37 proceeds to S52. In S52, the switching circuit 37 determines whether at least the sensors (the torque sensor 5b and the vehicle speed sensor 6b) for the control system 40 are functioning normally based on the determination results obtained by the sensor malfunction determination circuits 38, 48. This determination includes a determination as to whether all of the sensors (the torque sensor 5b and the vehicle speed sensor 6b) for the control system 40 are functioning normally or a determination as to whether all of the sensors (the torque sensor 5b and the vehicle speed sensor 6b) for the control system 30 are functioning normally. This includes a case where the switching circuit 37 proceeds to S53 when the sensors for the control system 40 are functioning normally even if where all of the sensors for the control system 30 are functioning normally (hereinafter, this case will be referred to as "exceptional case").

When at least all of the sensors (the torque sensor 5b and the vehicle speed sensor 6b) for the control system 40 are functioning normally, the switching circuit 37 proceeds to S53. In a case where all of the sensors (the torque sensor 5a and the vehicle speed sensor 6a) for the control system 30 are functioning normally, other than the exceptional case, the switching circuit 37 proceeds to S54.

In S53, the switching circuit 37 outputs the assist command value received from the control system 40 to the current control circuit 34. In S54, the switching circuit 37 outputs the assist command value received from the control system 30 to the current control circuit 34.

Next, the operation of the switching circuit 47 of the control system 40 will be described. FIG. 10 is a flowchart that is executed by the switching circuit 47 according to a switching program. In S60, the switching circuit 47 determines whether it is possible to execute assist control, based on the determination results obtained by the sensor malfunction determination circuits 38, 48.

The cases where it is not possible to execute the assist control include the foregoing cases (1) to (3). This is because, in any one of the cases (1) to (3), the assist control circuits 33, 43 of the control systems 30, 40 cannot calculate appropriate assist command values, and it is therefore not possible to execute the assist control.

In any one of the cases (1) to (3), the switching circuit 47 makes a negative determination, and proceeds to S61. When the switching circuit 47 proceeds to S61, the second control calculation circuit 41 stops the assist control, thereby stopping driving of the motor coils 16u, 16v, 16w.

When the switching circuit 47 determines that the present state is other than the cases (1) to (3), the switching circuit 47 proceeds to S62. In S62, the switching circuit 47 determines whether at least the sensors (the torque sensor 5b and the vehicle speed sensor 6b) for the control system 40 are functioning normally based on the determination results obtained by the sensor malfunction determination circuits 38, 48. This determination includes a determination as to whether all of the sensors (the torque sensor 5b and the vehicle speed sensor 6b) for the control system 40 are functioning normally or a determination as to whether all of the sensors (the torque sensor 5b and the vehicle speed sensor 6b) for the control system 30 are functioning normally. This includes a case where the switching circuit 47 proceeds to S63 when the sensors for the control system 40 are functioning normally even if where all of the sensors for the control system 30 are functioning normally (hereinafter, this case will be referred to as "exceptional case").

When at least all of the sensors (the torque sensor 5b and the vehicle speed sensor 6b) for the control system 40 are functioning normally, the switching circuit 47 proceeds to S63. In a case where all of the sensors (the torque sensor 5a and the vehicle speed sensor 6a) for the control system 30 are functioning normally, other than the exceptional case, the switching circuit 47 proceeds to S64.

In S63, the switching circuit 47 outputs the assist command value received from the control system 40 to the current control circuit 44. In S64, the switching circuit 47 outputs the assist command value received from the control system 30 to the current control circuit 44.

As a result, when both of the torque sensor 5b and the vehicle speed sensor 6b are functioning normally, in the control systems 30, 40, the motor coils 15u, 15v, 15w, 16u, 16v, 16w to be controlled by the control systems 30, 40 are driven based on the assist command value calculated by the assist control circuit 43 of the control system 40. When at least one of the torque sensor 5b and the vehicle speed sensor 6b is malfunctioning and all of the sensors (the torque sensor 5a and the vehicle speed sensor 6a) for the control system 30 are functioning normally, the motor coils 15u, 15v, 15w, 16u, 16v, 16w to be controlled by the control systems 30, 40 are driven based on the assist command value calculated by the assist control circuit 33 of the control system 30.

The following configuration may be employed as a modified example of the third embodiment. In S52 (S62) in FIG. 9 (FIG. 10) of the third embodiment, it may be determined whether at least the sensors for the control system 30, out of the control systems 30, 40, are functioning normally. When at least the sensors (the torque sensor 5a and the vehicle speed sensor 6a) for the control system 30 are functioning normally, the assist command value received from the control system 30 may be output to the current control circuit 34 in S53 (S63). Then, when it is determined in S52 (S62) that at least one of the sensors for the control system 30 is malfunctioning and both of the sensors (the torque sensor 5b and the vehicle speed sensor 6b) for the control system 40 are functioning normally, the assist command value received from the control system 40 may be output to the current control circuit 34 in S54 (S64).

The third embodiment and the modified example thereof have the following characteristics.

(1) In the motor control device 4 according to the present embodiment and the modified example thereof, the assist command value (command value) calculated by a control calculation circuit of a first control system is shared by the first control system and a second control system, and motor drive circuits (the first motor drive circuit 32 and the second motor drive circuit 42) of the first and second control systems drive the motor coils 15u, 15v, 15w, 16u, 16v, 16w based on the assist command value. Therefore, it is possible to prevent occurrence of a difference in assist command value for the assist control between the control systems 30, 40 due to variations of the input values from the torque sensors and variations of the input values from the vehicle speed sensors. For this reason, with the redundant system according to the present embodiment and the modified example thereof, it is possible to improve the performance of reducing torque ripples and noise and vibration (NV) of the motor 17, as compared with a redundant system including control systems that are completely independent from each other.

(2) In the present embodiment and the modified example thereof, when both of the torque sensor and the vehicle speed sensor for the first control system are functioning normally, the first and second control systems share the assist command value calculated by the assist control circuit of the first control system, whereas when at least one of the sensors for the first control system is malfunctioning and both of the torque sensor and the vehicle speed sensor for the second control system are functioning normally, the assist command value of the second control system is shared by the first and second control systems.

As described above, even if at least one of the sensors for the first control system is malfunctioning, when both of the sensors for the second control system are functioning normally, the first and second control systems share the assist command value calculated based on the parameters output from the normally-functioning sensors for the second control system. As a result, the foregoing advantageous effect (1) can be easily achieved.

In the motor control device 4 according to the present embodiment and the modified example thereof, when the sensor that detects the steering torque or the vehicle speed (parameter) for the first control system is malfunctioning, the assist command value (command value) calculated by the second control system with the normally-functioning sensors is shared by the first and second control systems. Thus, driving of the motor coils to be controlled by the control system with the malfunctioning sensor is not stopped. As a result, according to the present embodiment and the modified example thereof, even when the sensor that detects the steering torque or the vehicle speed (parameter) for the first control system is malfunctioning, the assist torque similar to that at normal times can be applied to the steering system.

(3) In the present embodiment and the modified example thereof, when all of the sensors for the control systems are functioning normally, both of the control systems always calculate the assist command values in synchronization. When a malfunction occurs in at least one of the sensors for the first control system, the assist command value calculated by the second control system, which executes calculation in synchronization with the first control system, can be used. Thus, a control delay does not occur. For this reason, at the time of switching of the assist command value, an occupant (for example, a driver) of the vehicle does not feel uncomfortable.

Figure 11:
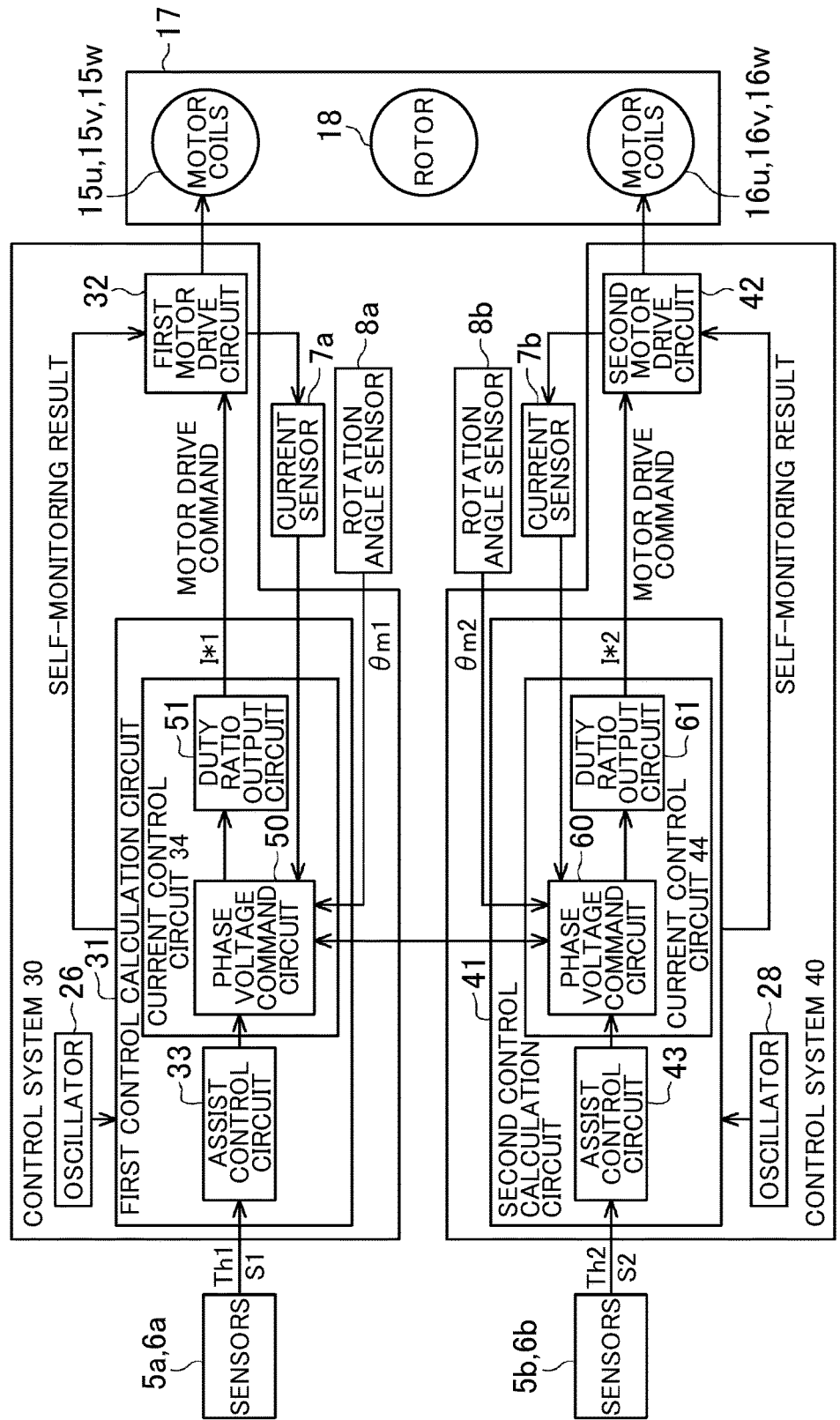
FIG. 11 is a block diagram of a motor control device according to a fourth embodiment.

Next, a motor control device 4 according to a fourth embodiment will be described with reference to FIG. 11 to FIG. 13. FIG. 11 is a block diagram of the motor control device 4 according to the present embodiment.

The motor control device 4 according to the present embodiment differs from the motor control device 4 according to the first embodiment as follows. The abnormality detection circuits 35, 45 are omitted in the present embodiment. The detection signals from the torque sensor 5*a* and the vehicle speed sensor 6*a* for the control system 30 are not input into the second control calculation circuit 41. The detection signals from the torque sensor 5*b* and the vehicle speed sensor 6*b* for the control system 40 are not input into the first control calculation circuit 31.

In the motor control device 4 according to the present embodiment, the process executed by the control calculation circuit of each control system differs depending on whether the current sensor 7*a* and the rotation angle sensor 8*a* for the control system 30 and the current sensor 7*b* and the rotation angle sensor 8*b* for the control system 40 are functioning normally or malfunctioning.

The current control circuit 34 of the control system 30 according to the embodiment includes a phase voltage command circuit 50 and a duty ratio output circuit 51. The current control circuit 44 of the control system 40 includes a phase voltage command circuit 60 and a duty ratio output circuit 61. The current sensors 7*a*, 7*b* and the rotation angle sensors 8*a*, 8*b* according to the present embodiment may each function as a parameter output circuit, and each of motor currents and the rotation angles θm1, θm2 is an example of a parameter.

The operation of the motor control device 4 having the foregoing configuration will be described below.

Figure 12:
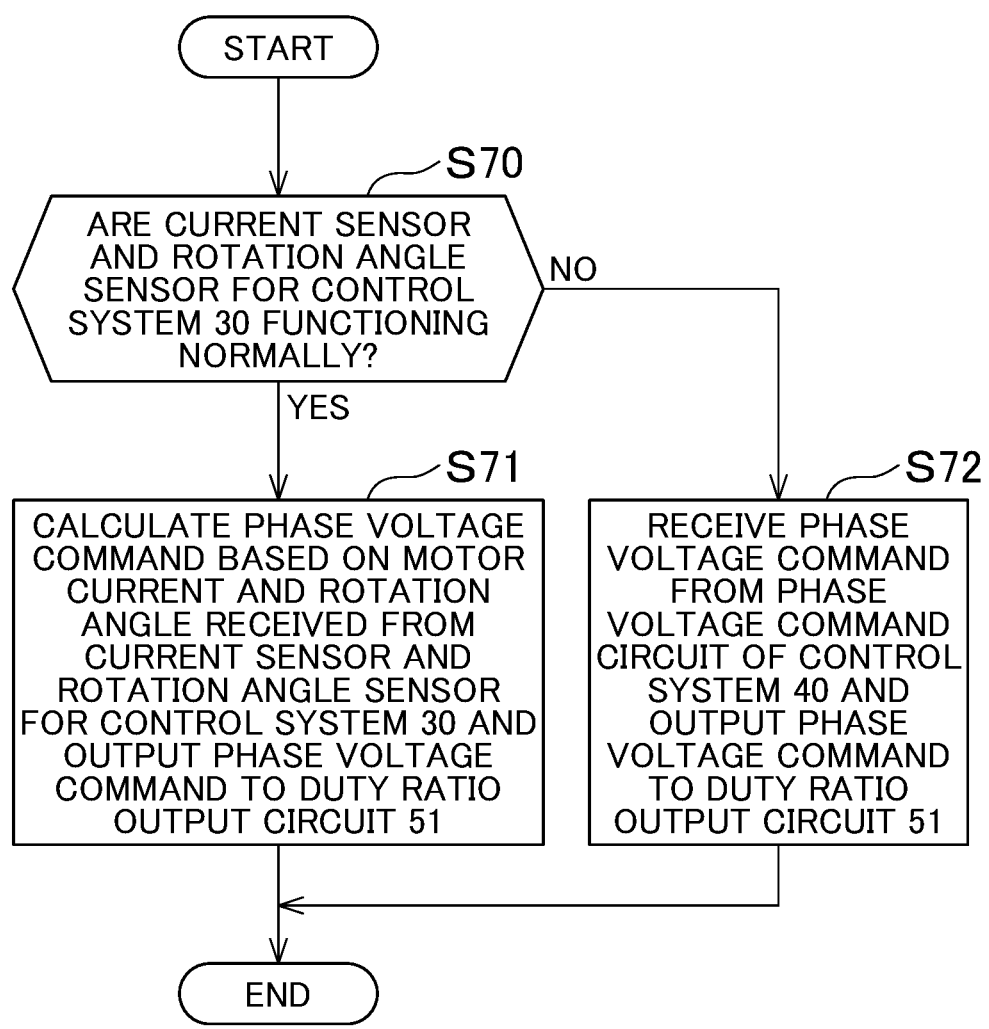
FIG. 12 is a flowchart executed by a current control circuit 34.
Figure 13:
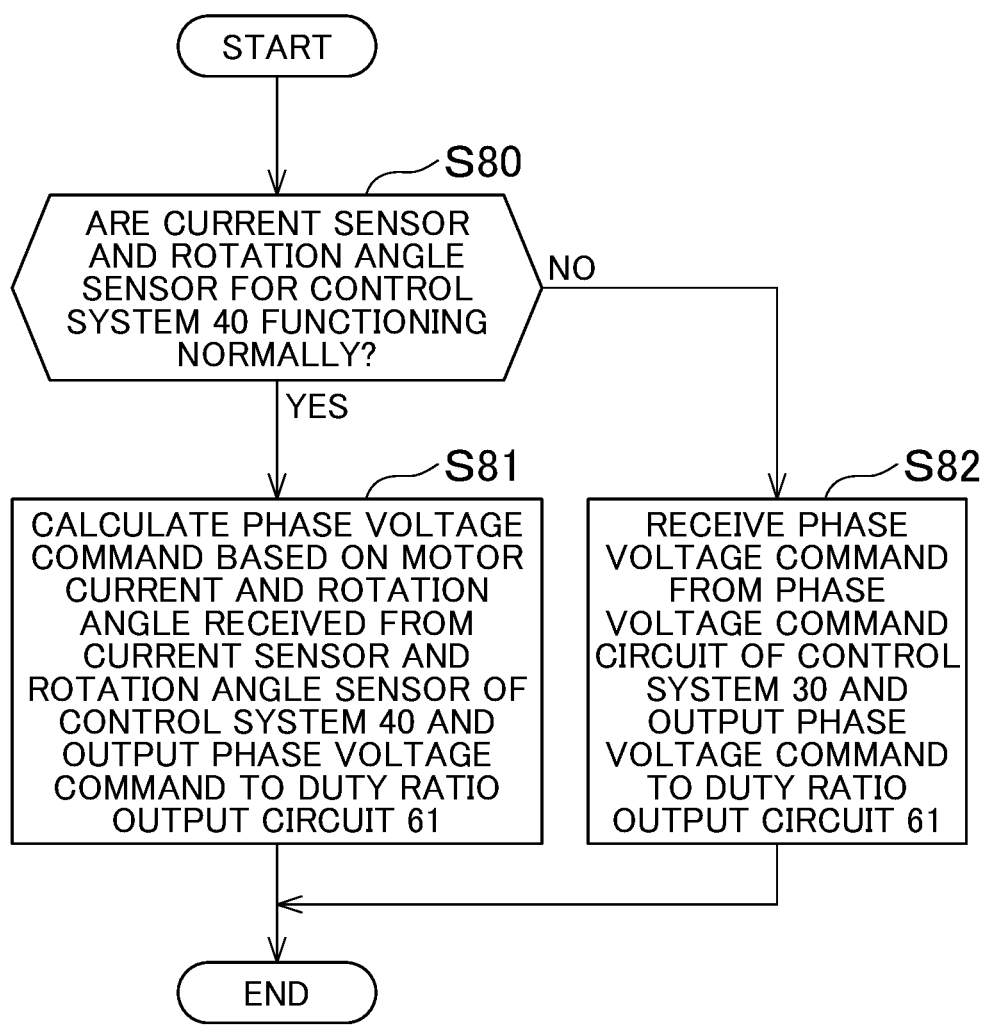
FIG. 13 is a flowchart that is executed by a current control circuit 44.

FIG. 12 is a flowchart that is executed by the current control circuit 34 according to a current control program. In S70, the current control circuit 34 determines whether both of the current sensor 7*a* and the rotation angle sensor 8*a* for the control system 30 are functioning normally. This determination is made based on comparison between the detection signals (that is, the motor current and the rotation angle) output from the sensors and abnormality determination thresholds (that is, a motor current abnormality determination threshold and a rotation angle abnormality determination threshold), or based on a detection result obtained by an abnormality detection circuit (not illustrated) and indicating, for example, an abnormality in the electric power supplied to the sensors.

When the current control circuit 34 determines in S70 that both of the current sensor 7*a* and the rotation angle sensor 8*a* for the control system 30 are functioning normally, the current control circuit 34 proceeds to S71. On the other hand, when the current control circuit 34 determines in S70 that at least one of the current sensor 7*a* and the rotation angle sensor 8*a* is malfunctioning, the current control circuit 34 proceeds to S72.

In S71, the current control circuit 34 obtains a phase voltage command value based on the motor current and the rotation angle θm1 respectively detected by the current sensor 7*a* and the rotation angle sensor 8*a*, and outputs a control signal I*1 calculated based on the phase voltage command value to the first motor drive circuit 32.

Specifically, the phase voltage command circuit 50 of the current control circuit 34 receives the assist command value (assist current command value), a rotation angle θm1, and motor currents of respective phases. The phase voltage command circuit 50 converts the motor currents of respective phases into a d-axis current value and a q-axis current value of a dq coordinate system with the use of the rotation angle θm1. The phase voltage command circuit 50 then executes current feedback control for causing the d-axis current value and the q-axis current value to follow a d-axis current command value and a q-axis current command value, thereby calculating a d-axis voltage command value and a q-axis voltage command value, respectively. Then, the phase voltage command circuit 50 converts the d-axis voltage command value and the q-axis voltage command value into phase voltage command values of respective phases with the use of the rotation angle θm1, and outputs the phase voltage command values to the duty ratio output circuit 51.

The duty ratio output circuit 51 obtains a duty ratio of each phase based on the phase voltage command value of each phase, and outputs the control signal I*1 of each phase calculated based on the duty ratio of each phase to the first motor drive circuit 32, thereby driving the first motor drive circuit 32 in a PWM manner.

Thus, driving electric power corresponding to the control signal I*1 is supplied from the first motor drive circuit 32 to the motor coils 15*u*, 15*v*, 15*w*. In S72, the current control circuit 34 receives the phase voltage command value from the control system 40 through inter-microcomputer communication, and outputs the phase voltage command value to the duty ratio output circuit 51.

The duty ratio output circuit 51 obtains the duty ratio of each phase based on the phase voltage command value, and outputs the control signal I*1 of each phase calculated based on the duty ratio of each phase to the first motor drive circuit 32, thereby driving the first motor drive circuit 32 in a PWM manner.

Thus, driving electric power corresponding to the control signal I*1 is supplied from the first motor drive circuit 32 to the motor coils 15*u*, 15*v*, 15*w*. FIG. 13 is a flowchart that is executed by the current control circuit 44 according to a current control program.

In S80, the current control circuit 44 determines whether both of the current sensor 7*b* and the rotation angle sensor 8*b* for the control system 40 are functioning normally. This determination is made based on comparison between the detection signals (that is, the motor current and the rotation angle) output from the sensors and abnormality determination thresholds (that is, a motor current abnormality determination threshold and a rotation angle abnormality determination threshold), or based on a detection result obtained by an abnormality detection circuit (not illustrated) and indicating, for example, an abnormality in the electric power supplied to the sensors.

When the current control circuit 44 determines in S80 that both of the current sensor 7*b* and the rotation angle sensor 8*b* for the control system 40 are functioning normally, the current control circuit 44 proceeds to S81. On the other hand, when the current control circuit 44 determines in S80 that at least one of the current sensor 7*b* and the rotation angle sensor 8*b* is malfunctioning, the current control circuit 44 proceeds to S82.

In S81, the current control circuit 44 obtains a phase voltage command value based on the motor current and the rotation angle θm2 respectively detected by the current sensor 7*b* and the rotation angle sensor 8*b*, and outputs a control signal I*2 calculated based on the phase voltage command value to the second motor drive circuit 42.

Specifically, the phase voltage command circuit 60 of the current control circuit 44 receives the assist command value (assist current command value), a rotation angle θm2, and motor currents of respective phases. The phase voltage command circuit 60 converts the motor currents of respective phases into a d-axis current value and a q-axis current value of a dq coordinate system with the use of the rotation angle θm2. The phase voltage command circuit 60 then executes current feedback control for causing the d-axis current value and the q-axis current value to follow a d-axis current command value and a q-axis current command value, thereby calculating a d-axis voltage command value and a q-axis voltage command value, respectively. Then, the phase voltage command circuit 60 converts the d-axis voltage command value and the q-axis voltage command value into phase voltage command values of respective phases with the use of the rotation angle θm2, and outputs the phase voltage command values to the duty ratio output circuit 61.

The duty ratio output circuit 61 obtains a duty ratio of each phase based on the phase voltage command value of each phase, and outputs the control signal I*2 of each phase calculated based on the duty ratio of each phase to the second motor drive circuit 42, thereby driving the second motor drive circuit 42 in a PWM manner.

Thus, driving electric power corresponding to the control signal I*2 is supplied from the second motor drive circuit 42 to the motor coils 16u, 16v, 16w. In S82, the current control circuit 44 receives the phase voltage command value from the control system 30 through inter-microcomputer communication, and outputs the phase voltage command value to the duty ratio output circuit 61. The duty ratio output circuit 61 obtains the duty ratio of each phase based on the phase voltage command value, and outputs the control signal I*2 of each phase calculated based on the duty ratio of each phase to the second motor drive circuit 42, thereby driving the second motor drive circuit 42 in a PWM manner.

Thus, driving electric power corresponding to the control signal I*2 is supplied from the second motor drive circuit 42 to the motor coils 16u, 16v, 16w. In this way, in the present embodiment, when at least one of the current sensor and the rotation angle sensor for a first control system, out of the control systems 30, 40, is malfunctioning, the control systems 30, 40 share the phase voltage command value obtained from a remaining second control system with the normally-functioning current sensor and rotation angle sensor through inter-microcomputer communication. Thus, even when at least one of the current sensor and the rotation angle sensor for the first control system is malfunctioning, it is possible to obtain the same motor output or substantially the same motor output as that in a case where the current sensor and the rotation sensor are functioning normally. The phase voltage command value is an example of a command value of a control calculation circuit.

The present embodiment has the following characteristic.

(1) In the motor control device 4 according to the present embodiment, when at least one of the current sensor and the rotation angle sensor for the first control system, out of the control systems 30, 40, is malfunctioning, the motor current and the rotation angle of the second control system with the normally-functioning current sensor and rotation angle sensor are shared by the control systems 30, 40, and the phase voltage command value obtained based on the shared parameters is shared, as the command value, by the control systems 30, 40. Thus, even when at least one of the current sensor and the rotation angle sensor for the first control system is malfunctioning, it is possible to obtain the same motor output or substantially the same motor output as that in a case where the current sensor and the rotation sensor are functioning normally.

Therefore, it is possible to prevent occurrence of a difference in assist command value between the control systems 30, 40, when the rotation angle sensor or the current sensor of one of the control systems 30, 40 is malfunctioning. For this reason, with the redundant system according to the present embodiment, it is possible to improve the performance of reducing torque ripples and noise and vibration (NV) of the motor 17, as compared with a redundant system including control systems that are completely independent from each other.

Embodiments of the invention are not limited to the foregoing embodiments, and may be modified as follows. In the first embodiment, the assist control circuits 33, 43 execute averaging calculation by taking an arithmetical average. Alternatively, circuits 33, 43 may execute averaging calculation by taking a geometric means.

In each of the foregoing embodiments, a three-phase motor is used as the motor having winding wires of two systems. However, the motor having winding wires of two systems is not limited to a three-phase motor, and a motor other than a three-phase may be used as the motor having winding wires of two systems. Further, the motor is not limited to a brushless motor, and may be a brushed motor.

In the first embodiment, the first modified example and the second modified example of the first embodiment, the second embodiment, and the first modified example and the second modified example of the second embodiment, when at least one of the torque sensor and the vehicle speed sensor for the first control system (the control system 30 or 40), out of the control systems 30, 40, is malfunctioning, the detection signals from the torque sensor and the vehicle speed sensor for the second control system (the control system 40 or 30) are shared by the control systems 30, 40. Alternatively, the following configuration may be employed. A first control system (for example, the control system 30) is provided as a master control system, and a second control system (for example, the control system 40) is provided as a slave control system. Only when at least one of the torque sensor and the vehicle speed sensor for the master control system (for example, the control system 30) is malfunctioning, the detection signals from the normal torque sensor and vehicle speed sensor for the slave control system (for example, the control system 40) may be shared by the slave control system and the master control system.

In the third embodiment and the modified example thereof, when at least one of the torque sensor or the vehicle speed sensor for the first control system (the control system 30 or 40), out of the control systems 30, 40, is malfunctioning, the assist command value (command value) of the second control system (the control system 40 or 30) is shared by the control systems 30, 40. Alternatively, the following configuration may be employed. A first control system (for example, the control system 30) is provided as a master control system, and a second control system (for example, the control system 40) is provided as a slave control system.

When all of the torque sensors and the vehicle speed sensors for the master control system and the slave control system are functioning normally, each control system calculates the assist command value based on the detection signals from the torque sensor and the vehicle speed sensor for the control system, and outputs the assist command value to the current control circuit of the control system.

Only when at least one of the torque sensor and the vehicle speed sensor for the master control system is malfunctioning, the assist command value (command value) calculated based on the detection signals from the normally-functioning torque sensor and vehicle speed sensor for the slave control system is shared by the slave control system and the master control system.

In the fourth embodiment, when at least one of the current sensor and the rotation angle sensor for the first control system (control system 30 or 40), out of the control systems 30, 40, is malfunctioning, the phase voltage command value calculated by the phase voltage command circuit of the second control system (control system 40 or 30) is shared by the control systems 30, 40. Alternatively, the following configuration may be employed. A first control system (for example, the control system 30) is provided as a master control system, and a second control system (for example, the control system 40) is provided as a slave control system. Only when the current sensor or the rotation angle sensor for the master control system is malfunctioning, the phase voltage command value of the slave control system is shared by the slave control system and the master control system.

In the fourth embodiment, when at least one of the current sensor and the rotation angle sensor for the first control system is malfunctioning, the phase voltage command value (command value) of the second control system is shared by the first and second control systems. Alternatively, when at least one of the current sensor and the rotation angle sensor for the first control system is malfunctioning, the detection signals from the normally-functioning current sensor and rotation angle sensor for the second control system may be shared by the first and second control systems.

The fourth embodiment may be combined with each of the first embodiment, the first modified example of the first embodiment, the second modified example of the first embodiment, the second embodiment, and the first modified example of the second embodiment, the second modified example of the second embodiment, the third embodiment, and the modified example of the third embodiment.

In each of the foregoing embodiments, the assist command value is calculated based on the steering torque and the vehicle speed. However, the assist command value may be calculated based on at least the steering torque. Embodiments of the invention are not limited to a motor control device of an electric power steering system. An embodiment of the invention may be a motor control device for a system other than an electric power steering system. For example, an embodiment of the invention may be a motor control device that controls motor coils of a plurality of systems, which rotationally drive a single rotor, with the use of control calculation circuits of the respective systems.

The invention claimed is:

1. A motor control device configured to drive a motor having winding wires of two systems,
the motor control device comprising first and second control systems, each configured to control driving of the winding wires of a respective one of the two systems, each of the first and second control systems including:
a motor drive circuit configured to drive motor coils of a corresponding one of the two systems;
a parameter output circuit configured to output parameters required to control the motor drive circuit; and
a control calculation circuit configured to calculate a command value based on the parameters of at least one of the first and second control systems, wherein
(1) in response to the parameter output circuits functioning normally so that each respective parameter output circuit outputs the parameters, the control calculation circuit for each of the first and second control systems is configured to calculate respective command values based on at least one of the parameters of the first and second control systems, or based on a value obtained by averaging at least one kind of parameters, out of the parameters, for each of the first and second control systems, and
(2) in response to one of the parameter output circuits functioning abnormally so that all of the parameters of the one parameter output circuit are not output, the command value calculated by the control calculation circuit of another of the parameter output circuits is shared by the first and second control systems, and
the motor drive circuit of the first and second control systems is configured to drive the motor coils of the respective two systems based on the command value.

2. The motor control device according to claim 1, wherein in response to a first parameter output circuit of the parameter output circuits of the first and second control systems malfunctioning, such that at least one of the parameters of the first parameter output circuit are not output, a corresponding parameter of the other of the parameter output circuits is used by each of the first and second control systems to calculate the respective command values.

3. An electric power steering system comprising the motor control device according to claim 1, wherein
the motor control device drives the motor coils of each of the phases to apply assist torque to a steering system, the motor coils being included in the motor having the winding wires of the two systems,
the parameter output circuit for each of the first and second control systems includes at least a torque sensor that detects a steering torque applied to a steering shaft included in the steering system, and
the control calculation circuit for each of the first and second control systems calculates an assist command value as the command value based on the steering torque.

4. An electric power steering system comprising the motor control device according to claim 1, wherein
the motor control device drives the motor coils of each of the phases to apply assist torque to a steering system, the motor coils being included in the motor having the winding wires of the two systems,
the motor having the winding wires of the two systems includes motor coils of a plurality of phases,
the parameter output circuit for each of the first and second control systems includes a rotation angle sensor that detects a rotation angle of the motor having the winding wires of the two systems, and a current sensor that detects a motor current flowing in each of the phases of the motor coils, and
the control calculation circuit for each of the first and second control systems includes an assist control circuit configured to calculate an assist command value based on a steering torque applied to a steering shaft of the steering system, a phase voltage command circuit configured to calculate a phase voltage command value based on the assist command value, the rotation angle, and the motor current flowing in each of the phases, and a duty ratio output circuit configured to calculate a duty command value as the command value based on the phase voltage command value.

* * * * *